(12) United States Patent
Tsuyuki et al.

(10) Patent No.: US 7,821,475 B2
(45) Date of Patent: Oct. 26, 2010

(54) IMAGE DISPLAY APPARATUS

(75) Inventors: Motomi Tsuyuki, Kawasaki (JP); Shoichi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 11/846,734

(22) Filed: Aug. 29, 2007

(65) Prior Publication Data
US 2008/0055193 A1    Mar. 6, 2008

(30) Foreign Application Priority Data
Aug. 31, 2006    (JP)    ............................. 2006-236439

(51) Int. Cl.
    G09G 5/00    (2006.01)
(52) U.S. Cl. .................. 345/7; 345/8; 345/204; 359/629
(58) Field of Classification Search ................ 345/7–9, 345/32, 204; 348/115; 358/448; 359/629–634
See application file for complete search history.

(56) References Cited

U.S. PATENT DOCUMENTS

| | | | | |
|---|---|---|---|---|
| 5,001,576 A * | 3/1991 | Tanaka et al. | ................ | 358/462 |
| 5,235,437 A * | 8/1993 | Katagiri et al. | ............. | 358/471 |
| 5,327,263 A * | 7/1994 | Katagiri et al. | ............. | 358/471 |
| 5,852,443 A * | 12/1998 | Kenworthy | .................. | 345/441 |
| 5,936,773 A * | 8/1999 | Togino | ........................ | 359/630 |
| 6,069,716 A * | 5/2000 | Yamamoto | .................. | 358/518 |
| 6,710,909 B2 * | 3/2004 | Naito | .......................... | 359/291 |
| 6,715,885 B2 * | 4/2004 | Hirose et al. | ................. | 353/69 |
| 7,609,880 B2 * | 10/2009 | Sakashita | .................... | 382/162 |
| 2002/0071185 A1 * | 6/2002 | Chretien et al. | ............. | 359/629 |
| 2006/0119951 A1 * | 6/2006 | McGuire | .................... | 359/630 |
| 2006/0284862 A1 * | 12/2006 | Uvarov et al. | ............... | 345/204 |
| 2007/0052700 A1 * | 3/2007 | Wheeler et al. | ............. | 345/419 |

FOREIGN PATENT DOCUMENTS

| | | |
|---|---|---|
| JP | 06-265815 | 9/1994 |
| JP | 2001-186442 | 7/2001 |

* cited by examiner

*Primary Examiner*—Kimnhung Nguyen
(74) *Attorney, Agent, or Firm*—Cowan, Liebowitz & Latman, P.C.

(57) ABSTRACT

The image display apparatus is capable of reducing moire fringe when electric inverse-correction is performed on an image output to an image display element. The apparatus includes an optical system for observation of an image displayed on an image display element, a processor performing distorting processing that electrically provides to an input image a distortion in a direction inverse to that of distortion as aberration generated by the optical system, and a filter providing a low-pass filter effect to the image observed through the optical system. When a first image region including a first number of pixels in the input image is converted into a second image region including a second number of pixels by the distorting processing, the filter provides the low-pass filter effect depending on the relationship between the first and second numbers of pixels to the second image region.

8 Claims, 20 Drawing Sheets

EFFECTIVE REGION OF IMAGE DISPLAY ELEMENT

INVERSELY-CORRECTED IMAGE

LOW LOW-PASS FILTER EFFECT

MIDDLE LOW-PASS FILTER EFFECT

HIGH LOW-PASS FILTER EFFECT

IMAGE DISPLAY APPARATUS

BACKGROUND OF THE INVENTION

The present invention relates to an image display apparatus such as a head-mounted display and a projector, which enlarges an original image displayed on an image display element and displays an enlarged image thereof.

A head-mounting type image display apparatus (head-mounted display: hereinafter, referred to as an "HMD") has been used which enlarges an image (original image) displayed on an image display element such as a CRT and an LCD and displays the enlarged image thereof through an optical system.

Since this HMD is mounted on a head of an observer, reductions in size and weight thereof are required. On the other hand, it is desired that the HMD have a good optical performance and can provide an enlarged image as large as possible.

However, when the optical system is made small, distortion and axial chromatic aberration are generated, which makes it difficult to achieve a good optical performance. On the contrary, when the optical system is designed to reduce generation of the distortion and various aberrations, it is difficult to reduce the size of the optical system. Therefore, an HMD has been proposed which electrically corrects the distortion and the chromatic aberration of the optical system to reduce a load for aberration corrections of the optical system, thereby enabling miniaturization of the HMD.

For example, an HMD has been disclosed in Japanese Patent Laid-Open No. 6-265815 which improves an apparent resolution by synthesizing images displayed in two liquid crystal panels on a retina of an observer. This HMD electrically distorts (corrects) the images displayed on the liquid crystal panels such that an influence of the distortion generated by an optical system is canceled.

Moreover, an HMD has been disclosed in Japanese Patent Laid-Open No. 2001-186442 which outputs right and left video signals while temporally alternately switching them to one image display element, and causes image light to alternately enter into right and left eyes in synchronization with the switching of the right and left video signals. This HMD electrically distorts (corrects) the right and left video signals such that distortions generated by right and left optical systems are respectively canceled.

Performing such electric distorting correction on the image output to the image display element like the HMDs disclosed in the above-mentioned publications so as to cancel the distortion of the optical system can cause the observer to view an image with reduced distortion. The electric distorting correction is hereinafter referred to as the "inverse-correction", and an image to which the inverse-correction was made is referred to as an inversely-corrected image.

However, when displaying the inversely-corrected image on the image display element with a high pixel number, moire fringe (interference fringe) generated by interference between regularly-arranged pixels and the distorted image may be observed. Therefore, even if the resolution of the image display apparatus is improved, the moire fringe will provide discomfort to the observer.

SUMMARY OF THE INVENTION

The present invention provides an image display apparatus capable of reducing generation of the moire fringe when the electric inverse-correction is performed on an image output to the image display element.

According to an aspect, the present invention provides an image display apparatus including an image display element, an optical system for observation of an image displayed on the image display element, a processor which performs distorting processing that electrically provides to an input image a distortion in a direction inverse to that of distortion as aberration generated by the optical system, and displays an image subjected to the distorting processing on the image display element, and a filter which provides a low-pass filter effect to the image that is observed through the optical system. When a first image region that includes a first number of pixels in the input image is converted into a second image region that includes a second number of pixels by the distorting processing, the filter provides the low-pass filter effect depending on the relationship between the first number of pixels and the second number of pixels to the second image region that is observed through the optical system.

According to another aspect, the present invention provides n image display system including the above-described image display apparatus and an image supplying apparatus which supplies image information to the image display apparatus.

Other objects and aspects of the present invention will become apparent from the following description and the attached drawings.

DESCRIPTION OF THE EMBODIMENTS

Embodiments of the present invention will hereinafter be described with reference to the accompanying drawings.

First of all, a basic concept of embodiments of the present invention will be explained by using FIGS. 6A to 6I. When light emerging from an image display element through an optical system is observed by an observer, it is preferable to be able to show a good image that does not distort as shown in FIG. 6C.

Figure 6A:
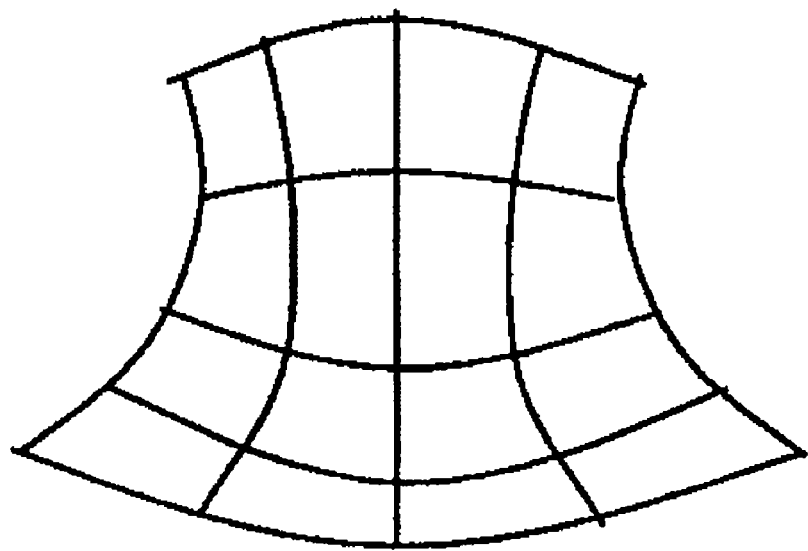
FIG. 6A is a figure showing an input image in a basic concept of embodiments of the present invention.
Figure 6B:
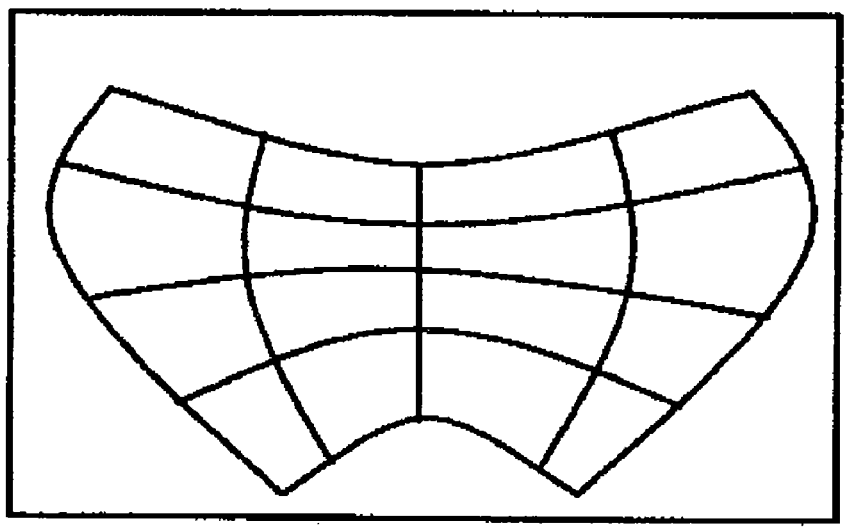
FIG. 6B is a figure showing an inversely-corrected image for the input image of FIG. 6A.

However, when the optical system has distortion as aberration, displaying an image without distortion on the image display element causes the observer to observe a distorted image as shown in FIG. 6A. Therefore, in this embodiment, as shown in FIG. 6B, an image on which electric distorting processing (or electric distorting correction, hereinafter referred to as "inverse-correction") was made so as to cancel the distortion of the optical system is output to the image display element. That is, an image to which a distortion was provided in a direction inverse to that of the distortion as aberration generated by the optical system is output to the image display element.

Figure 6C:
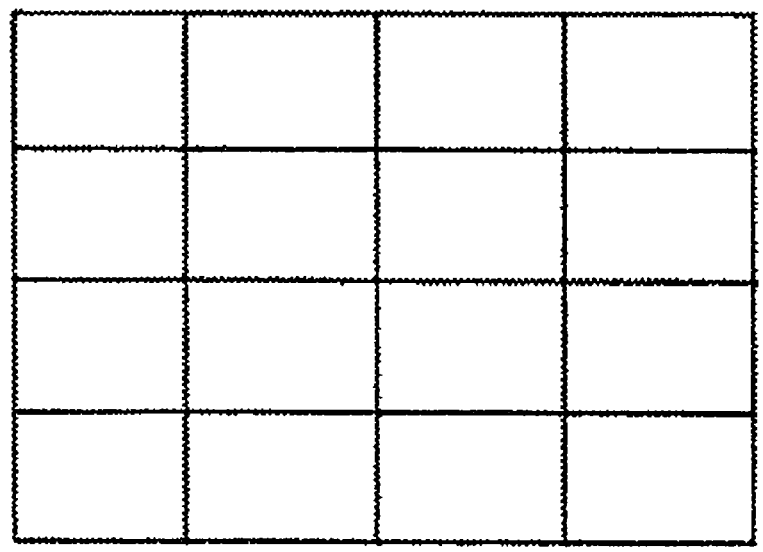
FIG. 6C is a figure showing an observed image in the basic concept of embodiments of the present invention.

The observer can observe an image with reduced distortion or without distortion as shown in FIG. 6C by observing through the optical system the image after the inverse-correction. An image on which the inverse-correction was made is referred to as an inversely-corrected image.

However, as mentioned above, when the distorted image is displayed on the image display element with a high pixel number, moire fringe may be generated. Therefore, in this embodiment, a low-pass filter effect is provided to the image observed through the optical system.

The wording "a low-pass filter effect is provided to the image observed through the optical system" includes providing an optical low-pass filter effect to an image formed with light rays emerging from the image display element, as described later. Furthermore, it also includes providing a low-pass filter effect by electric processing to an image output to (displayed on) the image display element.

In considering the low-pass filter effect, in this embodiment, H (horizontal)×V (vertical) pixels of an input signal of the image (input image) and image display element is used as the base. The resolution of the image input to the image display element is defined as:

$$H(\text{horizontal}) \times V(\text{vertical}) \text{ pixels} = X \text{ pixels} \times Y \text{ pixels}.$$

Figure 6D:
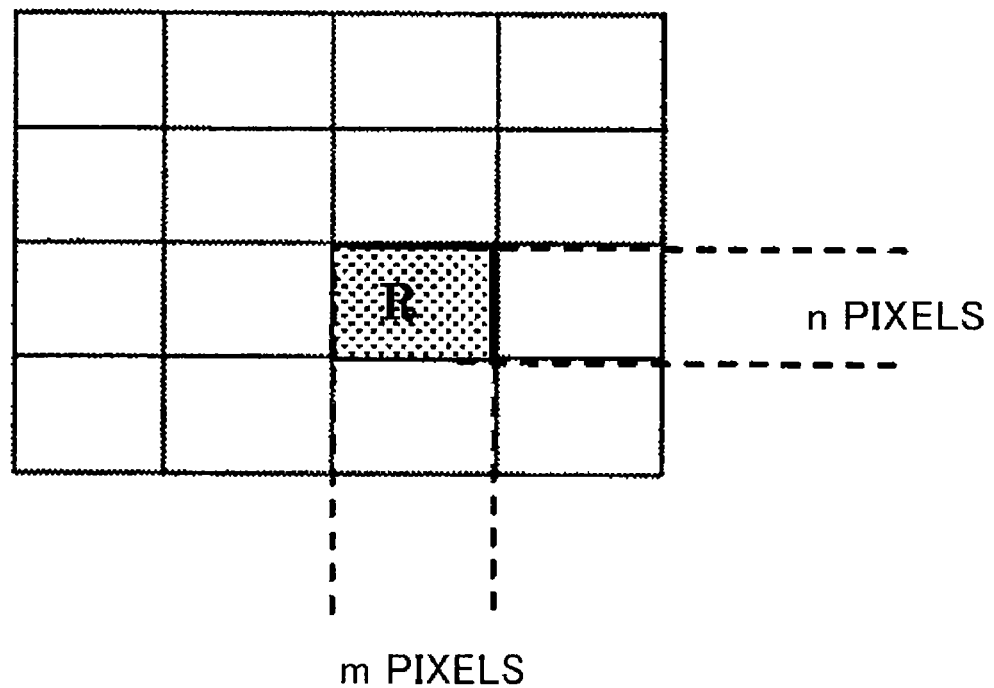
FIG. 6D is a figure showing region splitting of the input image in the basic concept of embodiments of the present invention.
Figure 6E:
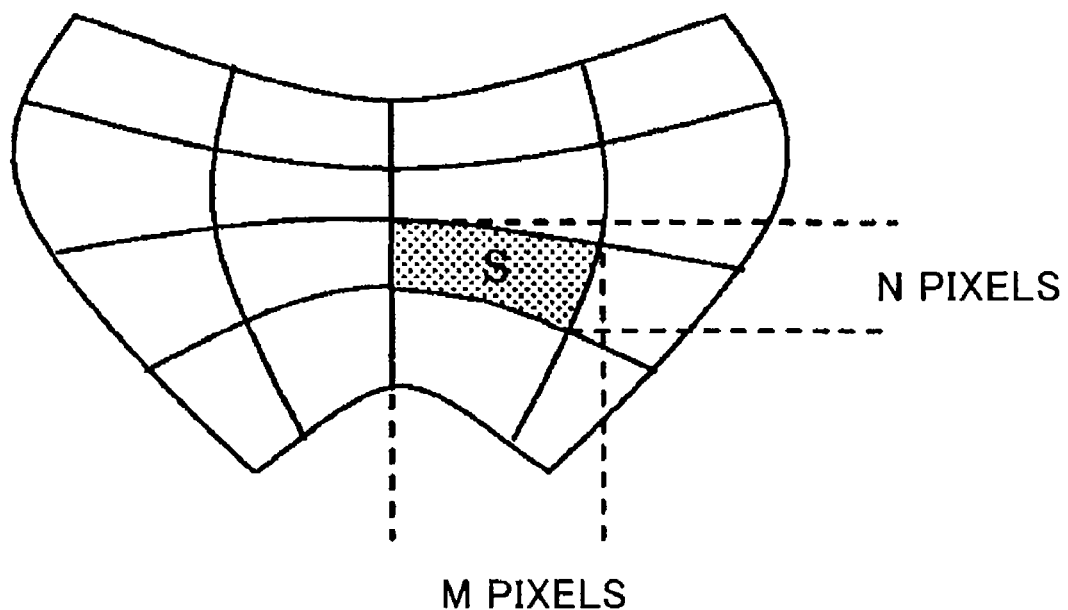
FIG. 6E is a figure showing an inversely-corrected image for the input image of FIG. 6D.

The input image is divided into plural regions (image regions) as shown in FIG. 6D, and one thereof is defined as a region R (m pixels (horizontal)×n pixels (vertical)). In this case, the region (first image region) R is converted by the inverse-correction into a region (second image region) S with distortion as shown in FIG. 6E, and then is output to the image display element. In this case, the maximum display pixel number of H×V that shows the region S is defined as M pixels×N pixels. That is, the region R (m pixels×n pixels) of the input image is converted by the inverse-correction into the region S (M pixels×N pixels), which produces an output image.

Next, the "low-pass filter effect" in this embodiment will be defined.

When an input image (monochrome line image) having the size for being displayed in the entire region on the image display element and including alternating white and black lines each being one-pixel line in the H direction is inversely corrected, an output image is generated in which the white and black lines have a certain distortion. In this case, when observing the image display element, it can be confirmed that each pixel of the image display element is resolved (a spatial frequency at this time is defined as E).

However, since the output image is output in a state in which the white and black lines are distorted, the pixels of the image display element interfere with the output image, which generates the moire fringe in some regions.

Moreover, the white and black lines after the inverse-correction are displayed as non-straight lines. Therefore, when observing this inverse-corrected monochrome line image through the optical system, the white and black lines are observed as step-like lines (for example, white lines including shading) in addition to the moire fringe. This is called "aliasing".

The low-pass filter effects include an "electric low-pass filter effect" that reduces the resolution of an inversely-corrected image when the image is output to the image display element.

More specifically, when the inversely-corrected monochrome line image is output, one pixel (A pixel) outputting a certain signal is noted in a region to be provided with the low-pass filter effect. In this case, a comparator, a calculator, and a substitutor are provided. The comparator compares the A pixel with a circumference pixel (B pixel) existing in the vicinity thereof. The calculator calculates an additional value according to the comparison result. The substitutor substitutes the A pixel and the circumference pixel B with the additional value. As a result, generation of the moire fringe and aliasing can be reduced in observation of the image output to the image display element through the optical system, while reducing the resolution of the white and black lines.

Furthermore, the low-pass filter effects also include an "optical low-pass filter effect". More specifically, the optical low-pass filter effect is obtained by a method of changing a ray-splitting width using birefringence of a liquid crystal element and a method of using birefringence of an optical material such as crystal or lithium niobate which is located at an arbitrary position between the liquid crystal element and the optical system. Furthermore, it is obtained by a method of using an optical element with a diffraction grating.

These optical low-pass filter effects correspond to an effect that optically changes a spatial frequency E' of the image displayed on the image display element (resolution of the image display element) into a spatial frequency F'. The spatial frequency F' represents, when birefringence of a liquid crystal element is used, a resolution of an image formed with light rays emerging from the liquid crystal element. Furthermore, the spatial frequency F' represents, when an optical material such as crystal is used, a resolution immediately after light rays emerging from the image display element passes the optical material. There are some cases where the resolution is not reduced even though the low-pass filter effect is provided. However, it can be said that the low-pass filter effect is also effective in those cases.

In particular, the optical material or the optical element having a diffraction grating is located at a position near the image display element or bonded on a cover glass having a role to protect a light-receiving surface of the image display element. As a result, a good low-pass filter effect can be obtained for the moire fringe and aliasing generated in the inversely-corrected image.

In this embodiment, the electric and optical low-pass filter effects are set as follows according to the relationship between the number of pixels in the region R shown in FIG. 6D showing a region splitting of the input image and the number of pixels in the region S shown in FIG. 6E showing an inversely-corrected image for the input image shown in FIG. 6D.

The setting in the H direction is as follows:

For $1 \leq M/m$, the low-pass filter effect is set to be an effect multiplying the spatial frequency of the output image by a value from 1 to 1/1.5;

For $0.8 \leq M/m < 1$, the low-pass filter effect is set to be an effect multiplying the spatial frequency of the output image by a value from 1 to 1/2.3; and For $M/m < 0.8$, the low-pass filter effect is set to be an effect multiplying the spatial frequency of the output image by a value from 1/1.4 to 1/2.5.

On the other hand, the setting in the V direction is as follows:

For $1 \leq N/n$, the low-pass filter effect is set to be an effect multiplying the spatial frequency of the output image by a value from 1 to 1/1.5;

For $0.8 \leq N/n < 1$, the low-pass filter effect is set to be an effect multiplying the spatial frequency of the output image by a value from 1 to 1/2.3; and For $N/n < 0.8$, the low-pass filter effect is set to be an effect multiplying the spatial frequency of the output image by a value from 1/1.4 to 1/2.5.

That is, in the case where the number of pixels (M or N) in the region S after the inverse-correction is less than that (m or n) in the region R in the input image, a higher low-pass filter effect is provided to the region S as compared with the case where the number of pixels in the region S is equal to or more than that in the region R.

In the case where the number of pixels in the region S is less than that in the region R, the low-pass filter effect provided to the region S becomes higher as the difference between the number of pixels in the region S and that in the region R increases (that is, as the number of pixels in the region S less than that in the region R reduces).

Under the above-mentioned setting condition, one with a higher low-pass filter effect is selected from the H and V directions as the direction in which the low-pass filter effect is provided to the region S, and the optical or electric low-pass filter effect is provided to the region S. This can reduce the moire fringe and the aliasing, thereby enabling to provide a good image.

When the input image and the image display element have quite a lot of number of pixels, even if the low-pass filter effect worsens the spatial frequency in some regions, the observer hardly minds the reduced moire fringe and aliasing. Furthermore, the low-pass filter effect is changed for each region of the output image. This can provide an image to the observer without reduction of the resolution in the region where the reduction thereof is not particularly needed.

Although the observer will observe the region with a high resolution and the region with a slightly reduced resolution at the same time, the observer does not mind a small difference of the resolutions. That is, the observer prefers the observation of an image with reduced distortion, moire fringe and aliasing to that of an image with a wholly reduced resolution. Moreover, the electric inverse-correction for correcting the distortion of the optical system reduces a load for the aberration correction by the optical system, thereby enabling a contribution to miniaturization of the optical system and correction of aberrations other than the distortion.

Although the region R and the region S were determined based on the reference coordinates (H direction×the V direction) so far, the regions may be determined on the basis of arbitrary coordinates.

Figure 6F:
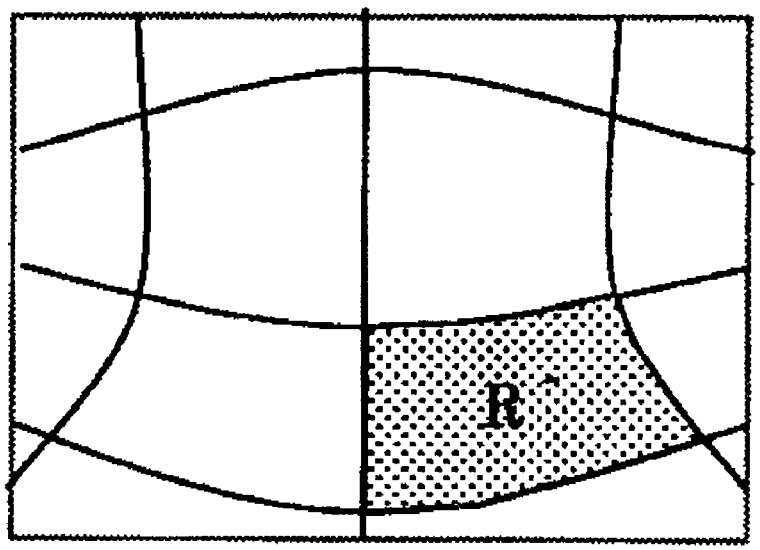
FIG. 6F is a figure showing a region splitting of the input image in the basic concept of embodiments of the present invention.
Figure 6G:
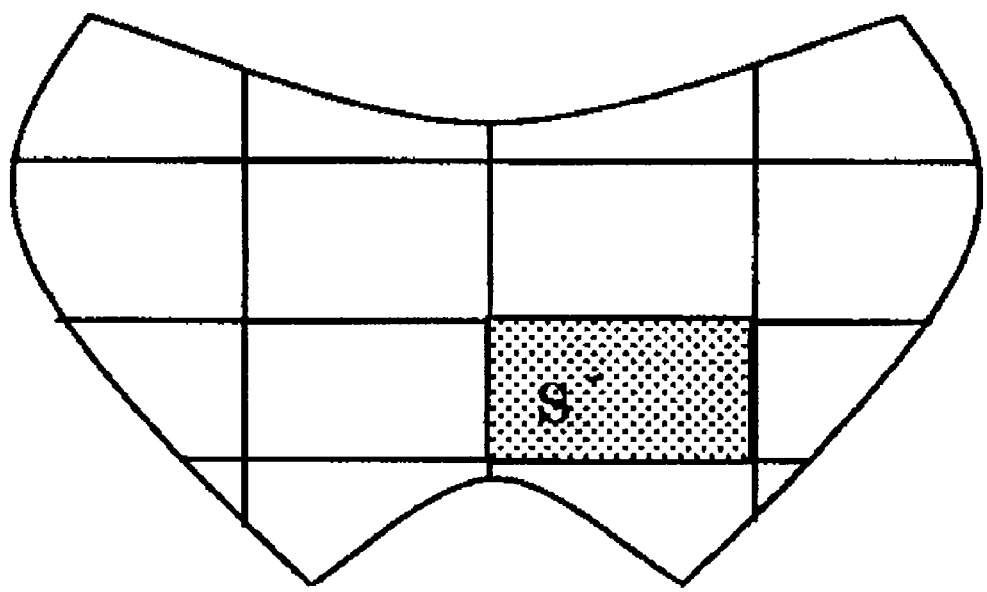
FIG. 6G is a figure showing an inversely-corrected image for the input image of FIG. 6F.

FIGS. 6D and 6E show a case where the region R of the input image is partitioned in parallel with the reference coordinates (H direction×V direction). However, as shown in FIG. 6G, the region S' of the image output (inversely-corrected image) to the image display element may be a region partitioned in parallel with the reference coordinates (H direction×V direction). In this case, the region R' of the input image is as shown in FIG. 6F.

Figure 6H:
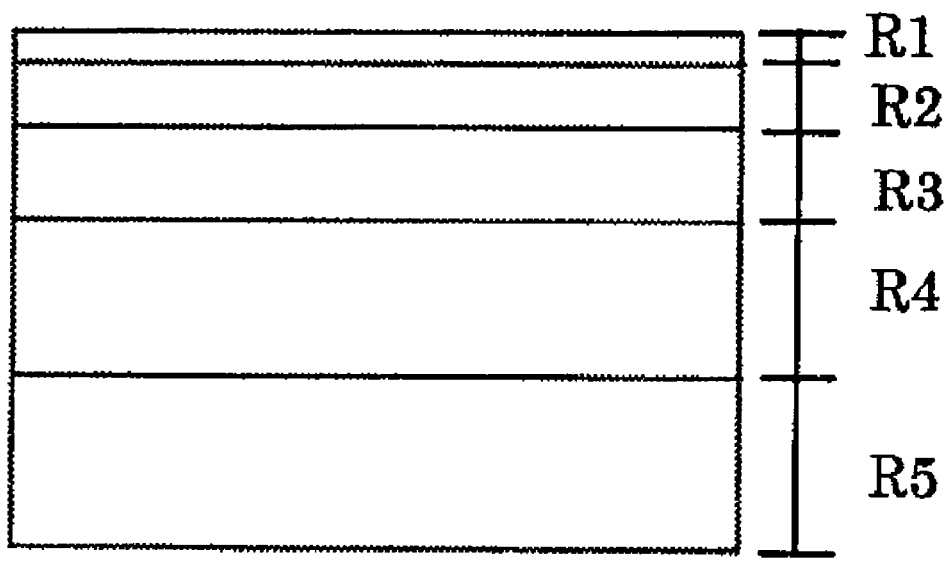
FIG. 6H is a figure showing a region splitting of the input image in the basic concept of embodiments of the present invention.
Figure 6I:
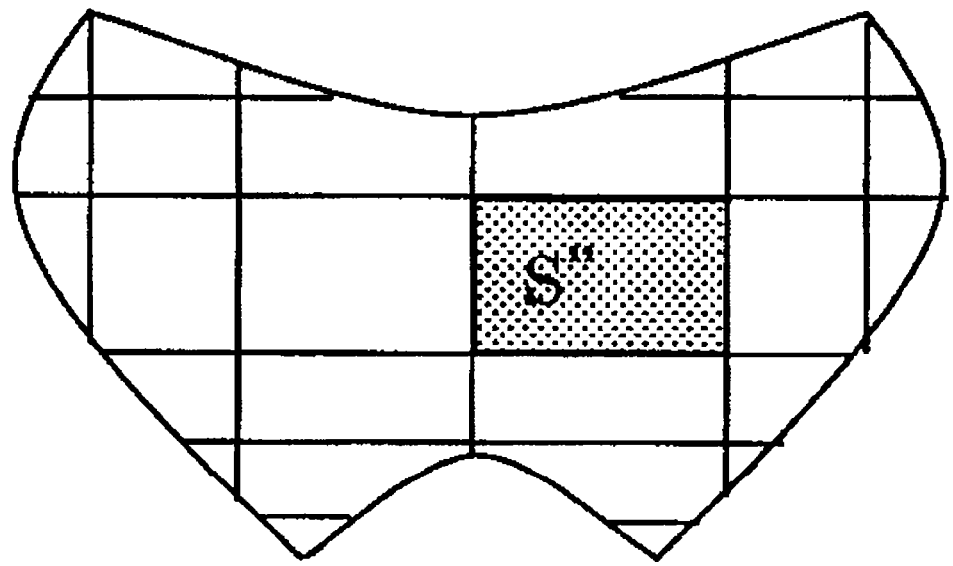
FIG. 6I is a figure showing a region splitting of the inversely-corrected image in the basic concept of embodiments of the present invention.

When the low-pass filter effect is provided for the regions parallel to the above-mentioned reference coordinates in the input image, the numbers of pixels (n pixels) in plural H-direction-regions R1 to R5 divided in the V direction may be different from each other as shown in FIG. 6H. On the other hand, when the low-pass filter effect is provided for the regions parallel to the above-mentioned reference coordinates in the output image (inversely-corrected image), the number of M pixels and the number of N pixels in plural regions S" may be different from each other as shown in FIG. 6I.

Furthermore, although the low-pass filter effect may be considered for the regions partitioned in parallel with the reference coordinates in one of the input image and the output image as described so far, it may be considered for a distorted region in both the images.

Figure 9A:
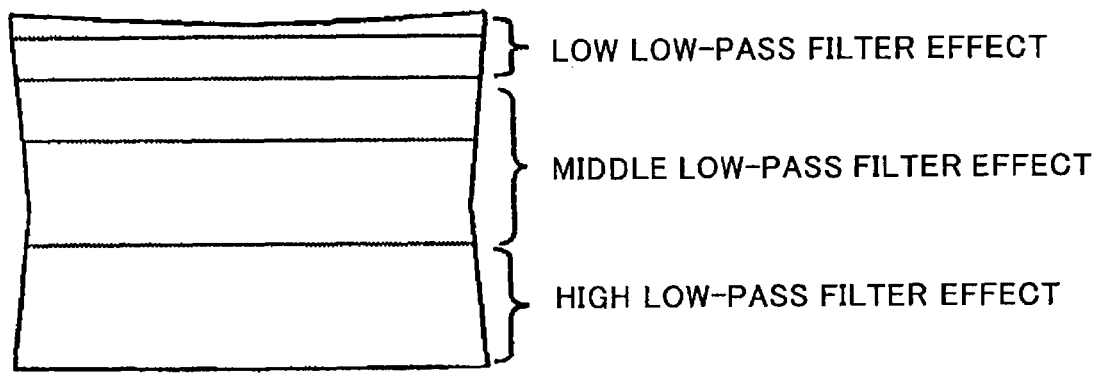
FIG. 9A is a figure showing an example of a low-pass filter effect achieved by an embodiment of the present invention.
Figure 9B:
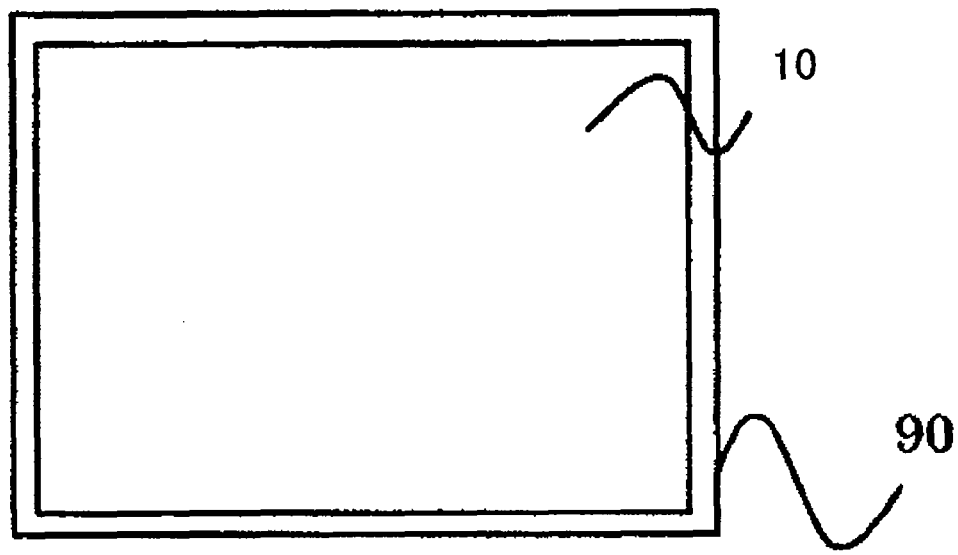
FIG. 9B is a front view showing the relationship between an optical low-pass filter and an image display element in the present invention.
Figure 9C:
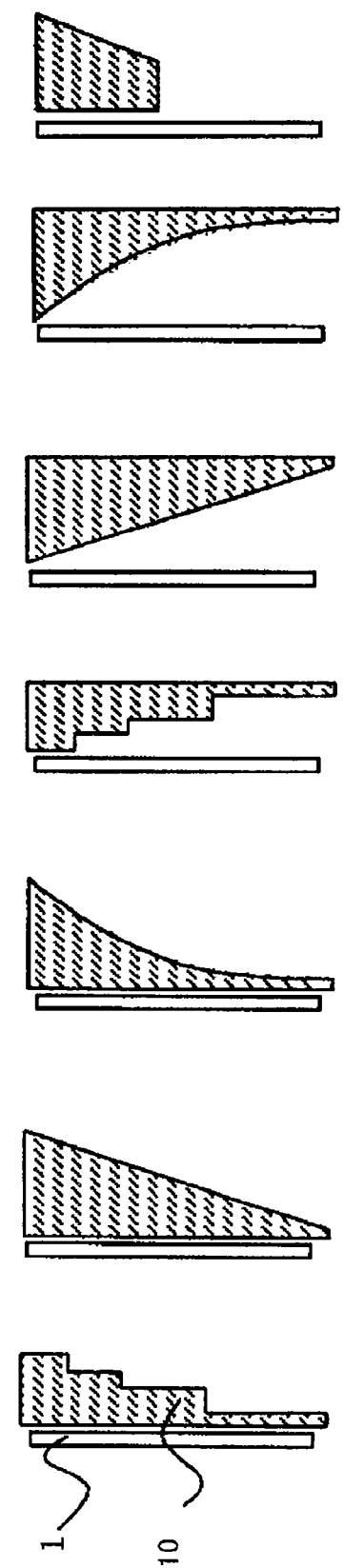
FIG. 9 C is a side view showing the relationship between the optical low-pass filter and the image display element in the present invention.

An example of changing the low-pass filter effect for each region by using the optical material is shown in FIGS. 9A to 9C.

FIG. 9A shows the results obtained by dividing the output image into plural regions (five regions in this example) in the V direction and applying them to the above-mentioned setting condition of the low-pass filter effect. In this case, as shown in FIG. 9B, a low-pass filter 90 formed of crystal that is the optical material is disposed on an image display element 10 or at a position close thereto to obtain a low-pass filter effect suitable for each region.

FIG. 9C shows various examples of the crystal low-pass filter 90 shown in FIG. 9B provided for the image display element 10 when viewed from their sides.

As shown in this figure, the thickness of the crystal is changed depending on the desired intensity of the low-pass filter effect. For example, when viewed from the side, the crystal is cut out in a step-like shape, in an obliquely linear shape, or in a curved shape.

The curved cutout surface is formed as a rotationally symmetric surface or a rotationally asymmetric surface according to the amount of the inverse-correction of the output image.

As shown at the right of FIG. 9C, the crystal may be cut out so that it is disposed only for some regions where the low-pass filter effect are required. In this case, the low-pass filter will not be provided for the region where the crystal is not disposed. However, this case is also included in embodiments of the present invention.

Figure 8A:
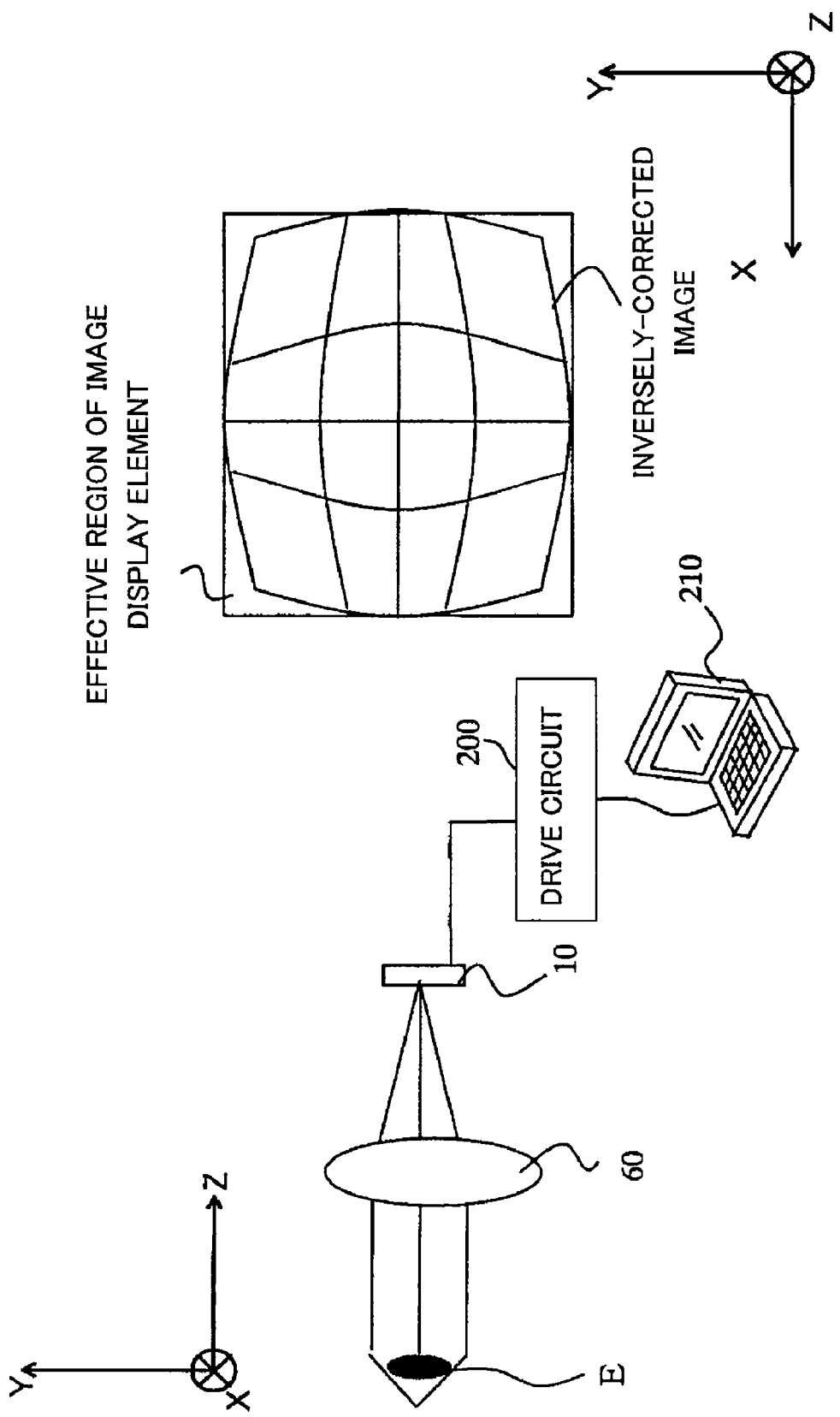
FIG. 8A is a figure showing an example of an HMD on which the present invention is applied.
Figure 8B:
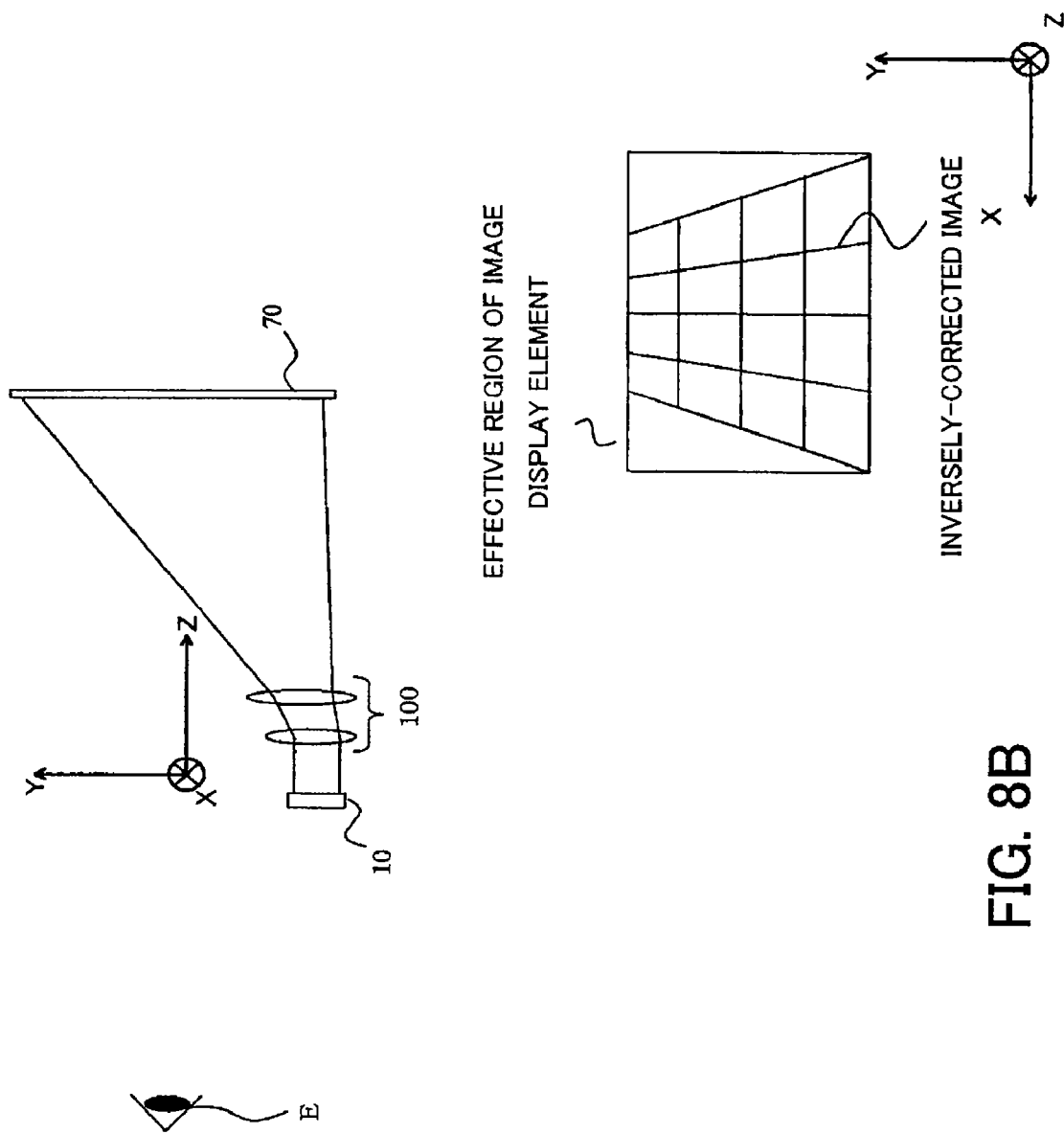
FIG. 8B is a figure showing an example of a projector on which an embodiment of the present invention is applied.

The image display apparatus that performs the electric inverse-correction of the input image and provides the low-pass filter effect, described above, can be embodied as an HMD shown in FIG. 8A and a projector shown in FIG. 8B. In addition, the image display apparatus is not limited to these HMD and projector, and can be embodied as other various image display apparatuses.

In FIG. 8A, reference numeral 10 denotes an image display element such as a liquid crystal panel. Reference numeral 60 denotes an ocular optical system that introduces a light flux from the image display element 10 to an eye E of an observer. The right figure of FIG. 8A shows the appearance of this HMD in which an output image (inversely-corrected image) obtained by inversely correcting an input image is displayed on the image display element 10.

The image display element 10 is electrically connected with a drive circuit (processor) 200. An image supplying apparatus 210 such as a personal computer, a DVD player, and a TV tuner is electrically connected with the drive circuit 200. The image supplying apparatus 210 supplies image information to the image display apparatus. The drive circuit 200 performs processing for the inverse-correction on the image (input image) input from the image supplying apparatus 210, and then displays the inversely-corrected image on the image display element 10.

When the electric low-pass filter effect is provided to the inversely-corrected image, the image subjected to that processing is displayed on the image display element 10. The image display apparatus and the image supplying apparatus 210 constitute an image display apparatus.

In FIG. 8B, reference numeral 10 denotes an image display element, and reference numeral 100 denotes a projection optical system that projects a light flux from the image display element 10 onto a screen 70. The lower figure of FIG. 8B shows the appearance of this projector in which an output image (inversely-corrected image) obtained by inversely correcting an input image is displayed on the image display element 10.

Although not shown, this projector is also connected with the image supplying apparatus shown in FIG. 8A, thereby constituting an image display system.

Embodiment 1

Figure 1A:
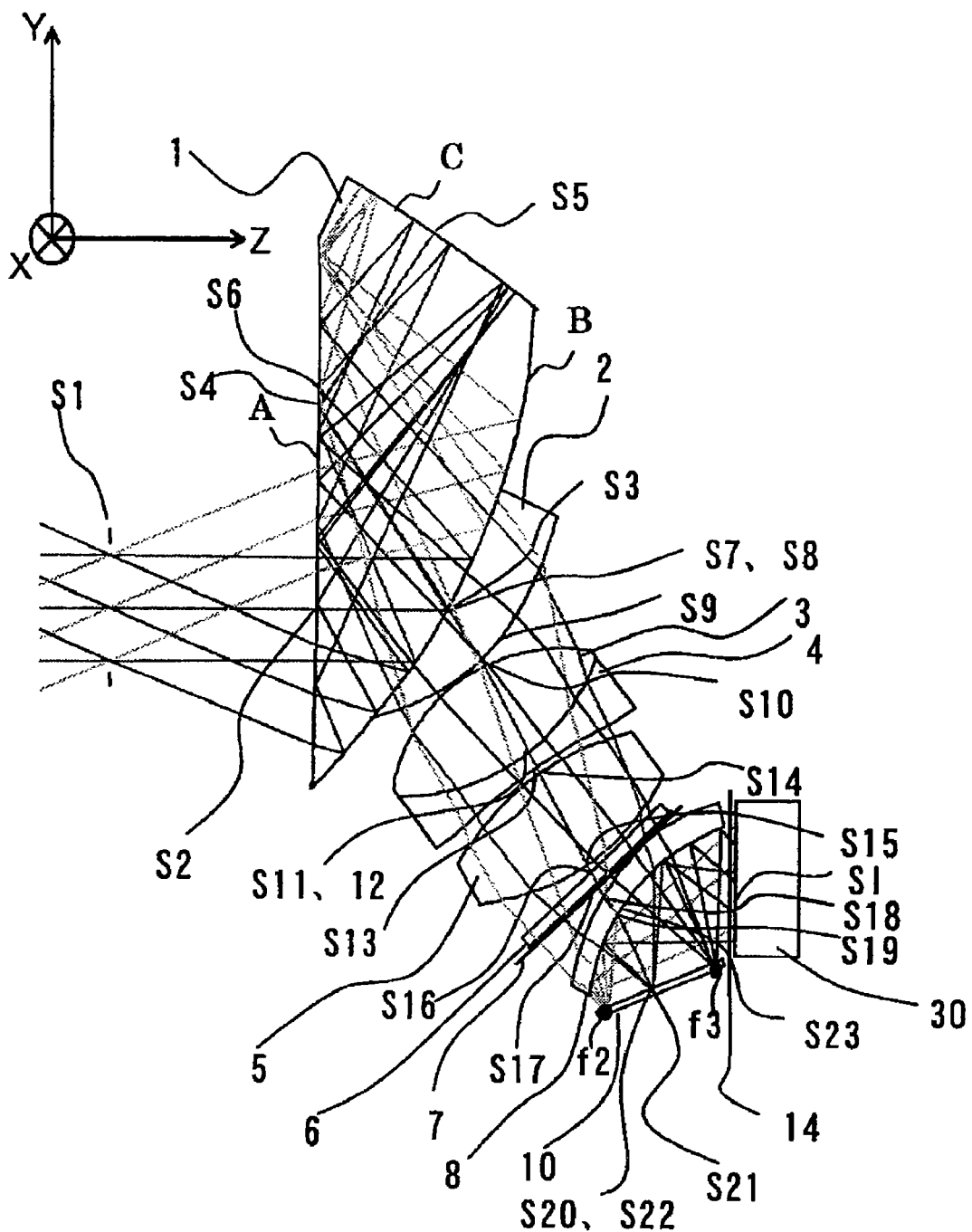
FIG. 1A is a cross-sectional view showing the configuration of an optical system that is Embodiment 1 of the present invention.

FIG. 1A shows the configuration of a display optical system for an HMD that is Embodiment 1 of the present invention.

An optical element 1 is a prism member having three or more optical surfaces that are a surface A (S2, S4, S6), a surface B (S3, S7), and a surface C (S5) on a transparent medium whose refractive index is larger than 1.

An optical element 2 is a prism member having two optical surfaces that are surfaces S8 and S9 on a transparent medium whose refractive index is larger than 1.

A lens 3 has surfaces S10 and S11, and a lens 4 has surfaces S12 and S13. These lenses 3 and 4 are cemented with each other at the surfaces S11 and S12.

A lens 5 has surfaces S14 and S15, and a flat plate 6 has surfaces S16 and S17. A decentered cylindrical lens 8 has a surface S18 and a surface S19 (identical with a surface S23). The surface S19 (S23) of this cylindrical lens 8 is a transmitting/reflecting surface (half mirror). Reference numeral 10 denotes an image display element. A reflective liquid crystal panel is used as the image display element 10 in this embodiment. Surfaces S20 (S22) and S21 are surfaces of a cover glass provided for the image display element 10 (hereinafter referred to as the LCD 10). Reference numeral S21 denotes an image-displaying surface of the LCD 10. Other elements than the LCD 10, such as a CRT, a transmissive liquid crystal panel, and an electroluminescent element, can be used as the image display element 10. This is applied to the embodiments described later.

A planar illumination light source is used for an illumination light source 30 (surface SI) in this embodiment. When light emitted from the illumination light source 30 enters the LCD 10, the cylindrical lens 8 has the role as an illumination optical system.

Reference numerals 7 and 14 denote polarizing plates. The lenses 3 and 4 are cemented with each other as described above. All optical surfaces other than those of these cemented lenses 3 and 4 and the cylindrical lens 8 have a plane-symmetric shape with respect to the sheet of FIG. 1A (yz-cross section) which is the only plane of symmetry.

The light emitted from the illumination light source 30 is transmitted through the polarizing plate 14 to be converted into linearly-polarized light, and then is reflected on a surface S23 of the cylindrical lens 8 to proceed to the LCD 10. The light obliquely entering the LCD 10 is reflected by the image-displaying surface S21 thereof in an oblique direction to enter the cylindrical lens 8 from its surface S19, and then emerges from its surface S18. The light is then transmitted through the polarizing plate 7 to enter the flat plate 6 from its surface S17, and then emerges from its surface S16 to proceed to the lens 5.

At this time, since the polarization direction of the linearly-polarized light entering the polarizing plate 14 is rotated in the LCD 10, the polarizing plate 7 is set so as to transmit that linearly-polarized light whose polarization direction is rotated.

When the polarization direction of the linearly-polarized light transmitted through the polarizing plate 7 shifts by 90° to the polarization direction of the linearly-polarized light transmitted through the polarizing plate 14 according to the polarization rotation angle of 90° by the LCD 10, the light converted into linearly-polarized light by the polarizing plate 14 may be transmitted through the surface S23 without being reflected thereon and become ghost light. However, this ghost light can be cut by the polarizing plate 7, so that entrance of the ghost light into observer's eye can be prevented.

The light entering the lens 5 from the surface S15 emerges from the surface S14, and then enters the lens 4 from the surface S13. The light is transmitted through the surface S12 of the lens 4 and the surface S11 of the lens 3, and then emerges from the surface S10 to proceed to the optical element 2.

The light entering the optical element 2 from the surface S9 is transmitted through the surface S8 of the optical element 2 and the surface S7 of the optical element 1 to enter the optical element 1. The surface S8 of the optical element 2 is cemented with the surface S7 of the optical element 1.

In the optical element 1, the light entering from the surface B (S7) is reflected by the surface A (S6) to be introduced to the surface C (S5). The light incident on the surface C (S5) is subjected to a returning reflection in which the light is reflected to the opposite side (the returning reflection will be described later), and then proceeds in the opposite direction to that of light before the returning reflection on the surface C. The light reflected on the surface C (S5) is again reflected on the surface A (S4), further again reflected on the surface B (S3) and then emerges from the surface A (S2) to proceed to an exit pupil S1.

At this time, rays from ends of the image-displaying surface (S21) intersect with each other in the optical element 1 to form an intermediate image-forming surface of the image displayed on the image-displaying surface. In this embodiment, the intermediate image is formed between the reflection points on the surfaces S4 and S5. However, the intermediate image needs not to be formed therebetween.

This embodiment has a so-called ocular optical system part that introduces the light flux passing through the intermediate image-forming surface to the exit pupil S1 as a parallel light flux. In order to facilitate the aberration correction in the ocular optical system part, it is preferable that the intermediate image is formed such that it has an appropriate curvature or an appropriate astigmatic difference depending on the generation situation of field curvature or astigmatism in the ocular optical system part.

The optical surfaces from the surface S5 for reflection of the light flux to the surface S2 for emergence thereof correspond to the ocular optical system part, and part of the optical element 1 other than the above optical surfaces and an optical system disposed between the optical element 1 and the cover glasses of the LCD 10 correspond to a relay optical system part. The surface S3 when acting as the final reflecting surface serves as a concave mirror having a very strong power with respect to the surface S2 when acting as an emergent surface. Therefore, it is difficult to completely correct the aberration in the ocular optical system part.

For this reason, in this embodiment, an intermediate image is formed on the intermediate image-forming surface such that the aberration in the ocular optical system part is canceled by the relay optical system part. As a result, the quality of a finally-observed image can be improved.

When the reflection on the surface S4 is an internal total reflection in the optical element 1, loss of light amount is reduced, which is preferable. When the reflections on at least a region used by the light flux emerging from the surface S2 and the light flux reflected on the surface S4 are internal total reflections, a brightness at the same level as that in a case where all reflections are internal total reflections is secured while raising the design freedom of the optical system.

In this case, the reflection on the surface S4 which is not an internal total reflection is a reflection by a reflective film. Moreover, the reflection on the surface S5 is a reflection by a reflective film.

In the optical element 1, the light passes the surfaces in the following order: the surface B→the surface A→the surface C→the surface A→the surface B (→the surface A). That is, the light traces an optical path from the reflecting surface C that serves as the boundary to the final reflecting surface B, the optical path being inverse to that before the boundary, and thus forms a first path: the surface B→the surface A→the surface C, and a second (returning) path: the surface C→the surface A→the surface B.

The reflection that switches the optical path from the first path to the returning path like that on the surface C is referred to as a "returning reflection", and the surface having such a returning reflection function is referred to as a "returning surface". Thus, a long optical length can be contained in the small optical element 1 by folding the optical path with the plural decentered reflecting surfaces A, B and C to duplicate the first and returning paths. As a result, the size of the entire display optical system shown in FIG. 1A can be reduced.

When a ray impinging on the returning surface is reflected thereby to form a predetermined angle of θ before and after the reflection, the angle θ is preferable to satisfy the following expression:

$$|\theta|<60° \quad (1)$$

If the angle θ does not satisfy the conditional expression (1), the optical path (returning path) after the returning reflection does not retrace the first path, and thus the optical path becomes a zigzag optical path rather than a reciprocating optical path. As a result, the size of the optical element 1 may increase.

Furthermore, the angle θ preferably satisfies a condition of the following expression:

$$|\theta|<30° \quad (2)$$

If the angle θ does not satisfy the conditional expression (2), the overlapping degree of the first and returning paths becomes small though the returning path retraces the first path. Therefore, the size of the optical element 1 becomes large, which may make it difficult to miniaturize the entire display optical system.

Furthermore, if the angle θ satisfies a condition of the following expression, the entire display optical system can be more miniaturized.

$$|\theta|<20° \quad (3)$$

A numerical example of the display optical system of this embodiment is shown in Table 1.

In a conventional system definition that does not correspond to a decentered system, each surface is defined by a coordinate system (surface vertex coordinate system) based on the vertex of each surface. That is, a z-axis is defined as an optical axis, a yz-cross section is defined as a conventional generatrix cross section (meridional cross section), and an xz-cross section is defined as a directrix cross section (sagittal cross section).

However, since the display optical system of this embodiment is a decentered system, a local generatrix cross section and a local directrix cross section that correspond to the decentered system are newly defined here.

When a ray passing through a position corresponding to the center of the inversely-corrected image displayed on the image display element and the center of the exit pupil is defined as a central field-angle principal ray, a cross section including an incident ray portion and an emergent ray portion of the central field-angle principal ray at a hit point of the central field-angle principal ray on each surface is defined as the local generatrix cross section.

Moreover, a cross section including the hit point of each surface and vertical to the local generatrix cross section and parallel to the directrix cross section of the surface vertex coordinate system (that is, a usual directrix cross section) is defined as the local directrix cross section.

The curvature of each surface in the vicinity of the hit point of the central field-angle principal ray is calculated, wherein the curvature radius in the local generatrix cross section of each surface is defined as ry, and the curvature radius in the local directrix cross section is defined as rx.

Hereinafter, how to see the optical data in Table 1 will be explained. This is the same in other embodiments described later.

Item SURF shown at the most left in Table 1 represents the surface number (i of Si). Items X, Y, and Z represent the location (x, y, z) of the vertex of each surface in the coordinate system having the origin (0, 0, 0) located at the center of the first surface S1, the y- and z-axes shown in the figure, and the x-axis perpendicular to the sheet of the figure. Item A represents a rotation angle "a" (degrees) of each surface around the x-axis, which is positive in the counterclockwise direction in the figure.

Item Typ represents types of surface shape. SPH represents a spherical surface, FFS represents a rotationally asymmetric surface, and CYL represents a cylindrical lens surface having a refractive power only in the generatrix cross section. The rotationally asymmetric surface in this embodiment is represented by a conditional expression of FFS listed below. YTO shows that the generatrix cross section is represented by the aspheric surface conditional expression listed below and the directrix section is a plane ($rx=\infty$).

The item of R represents the curvature radius of each surface. For the cylindrical lens surface, the value of the curvature radius ry on the generatrix cross section is listed.

FFS:

$$z = (1/R) \times (x^2 + y^2) / \left(1 + (1 - (1+k) \times (1/R)^2 \times (x^2 + y^2))^{(1/2)}\right) +$$
$$c2 + c4 \times y + c5 \times (x^2 - y^2) + c6 \times (-1 + 2 \times x^2 + 2 \times y^2) +$$
$$c10 \times (-2 \times y + 3 \times x^2 \times y + 3 \times y^3) +$$
$$c11 \times (3 \times x^2 \times y - y^3) + c12 \times (x^4 - 6 \times x^2 \times y^2 + y^4) +$$
$$c13 \times (-3 \times x^2 + 4 \times x^4 + 3 \times y^2 - 4 \times y^4) +$$
$$c14 \times (1 - 6 \times x^2 + 6 \times x^4 - 6 \times y^2 + 12 \times x^2 \times y^2 + 6 \times y^4) + c20 \times$$
$$(3 \times y - 12 \times x^2 \times y + 10 \times x^4 \times y - 12 \times y^3 + 20 \times x^2 \times y^3 + 10 \times y^5) +$$
$$c21 \times (-12 \times x^2 \times y + 15 \times x^4 \times y + 4 \times y^3 + 10 \times x^2 \times y^3 - 5 \times y^5) +$$
$$c22 \times (5 \times x^4 \times y - 10 \times x^2 \times y^3 + y^5) +$$
$$c23 \times (x^6 - 15 \times x^4 \times y^2 + 15 \times x^2 \times y^4 - y^6) +$$
$$c24 \times (-5 \times x^4 + 6 \times x^6 + 30 \times x^2 \times y^2 - 30 \times x^4 \times y^2 - 5 \times y^4 -$$
$$30 \times x^2 \times y^4 + 6 \times y^6) + c25 \times (6 \times x^2 - 20 \times x^4 + 15 \times x^6 -$$
$$6 \times y^2 + 15 \times x^4 \times y^2 + 20 \times y^4 - 15 \times x^2 \times y^4 - 15 \times y^6) +$$
$$c26 \times (-1 + 12 \times x^2 - 30 \times x^4 + 20 \times x^6 + 12 \times y^2 - 60 \times x^2 \times y^2 +$$
$$60 \times x^4 \times y^2 - 30 \times y^4 + 60 \times x^2 \times y^4 + 20 \times y^6) + \ldots$$

The value described in the field of Typ next to FFS represents that the surface shape is a rotationally asymmetric shape corresponding to an aspheric surface coefficient k and c that are described under the table. However, the value of c that is not described is 0.

Nd and vd respectively represent the refractive index and the Abbe number of the medium forming the surface in the d-line wavelength. The change in signs of the refractive index Nd shows that the light is reflected on the surface. When the medium is an air layer, only the refractive index Nd is described as 1.0000 and the Abbe number vd is omitted.

The unit of length in Table 1 is mm. Therefore, the optical system shown in Table 1 is a display optical system that displays an image whose size is about 18 mm×14 mm and horizontal field angle is 60° at the infinite position in the direction of the z-axis.

In this embodiment, an extremely large distortion is generated by the optical system. Therefore, an image subjected to the electric distorting processing (inverse-correction) in the direction inverse to that of the distortion generated by the optical system is output to the image display element.

Figure 7:
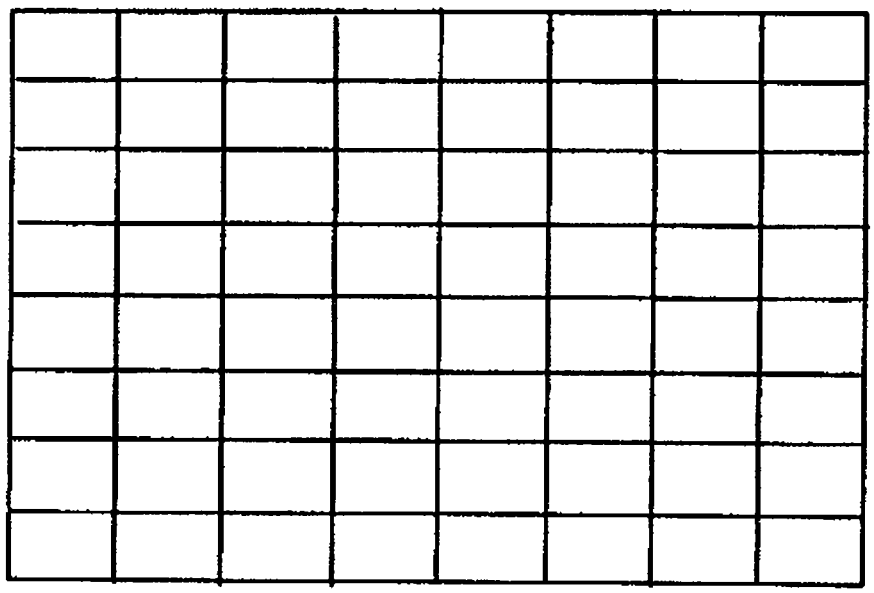
FIG. 7 is a figure showing a region splitting of the input image in Embodiments 1 to 5 of the present invention.

In this embodiment, the input image is divided into 8×8 regions in the H and V directions as shown in FIG. 7. This is the same in other embodiments described later.

In this embodiment, the number of pixels of the input image is the same as that of the image display element. This is the same in other embodiments described later.

Figure 1B:
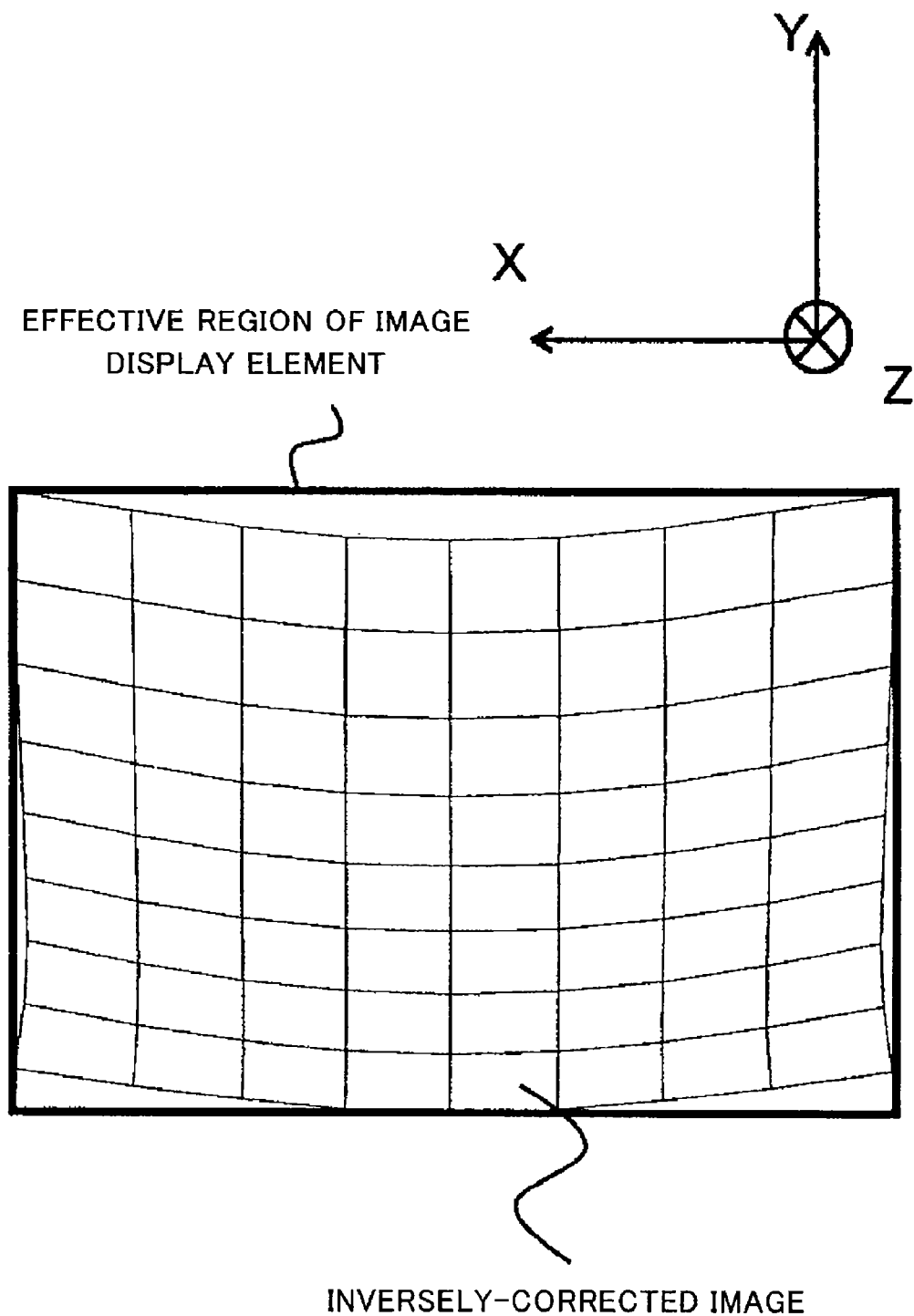
FIG. 1B is a figure showing an inversely-corrected image in Embodiment 1.

The output image (inversely-corrected image) obtained by inversely correcting the input image (FIG. 7) is shown in FIG. 1B. The calculation results of the low-pass filter effect for each of 8×8 regions in the output image distorted as shown in FIG. 1B are shown in FIG. 1C, the calculation being performed according to the above-mentioned setting condition of the low-pass filter effect.

Figure 1C:
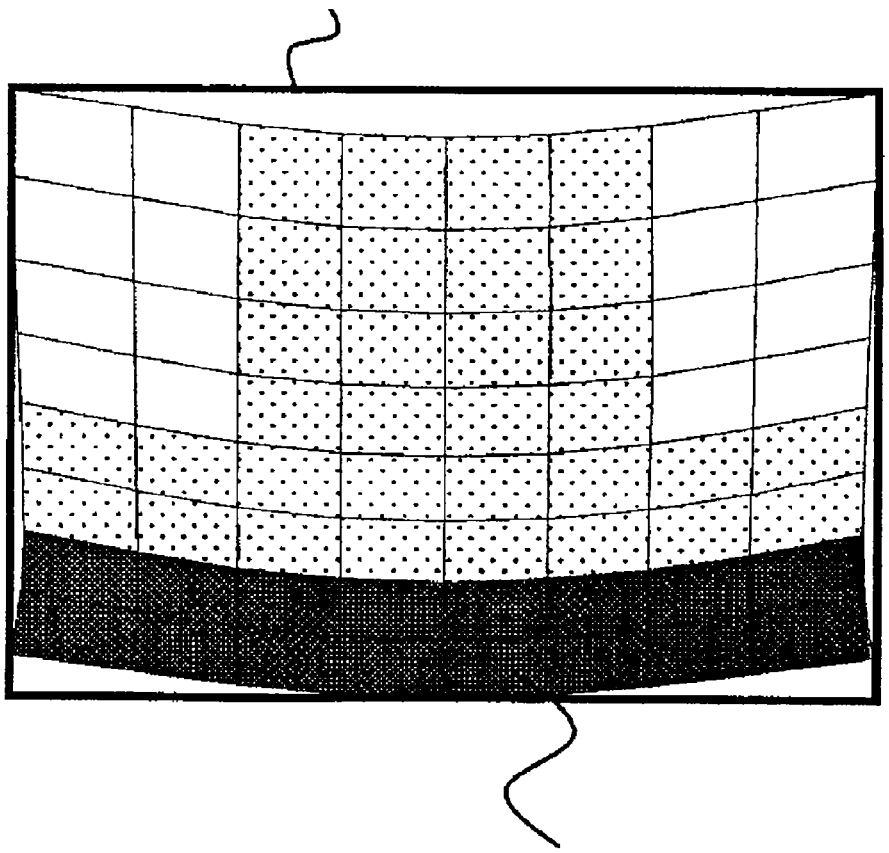
FIG. 1C is a figure showing the intensity of a low-pass filter effect in Embodiment 1.
Figure 1C:
Figure 1C:
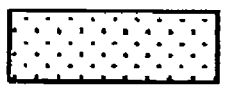
Figure 1C:

FIG. 1C shows a region where the low-pass filter effect is high, a region where the low-pass filter effect is middle, and a region where the low-pass filter effect is low.

Thus, in this embodiment, the distortion is not corrected by the optical system, so that the optical system can be configured so as to contribute to corrections of various aberrations other than the distortion and to miniaturization of the optical system. This embodiment achieves a display optical system (that is, an image display apparatus) having an extremely good optical performance and thereby enabling to provide an image with reduced distortion while its size is small.

Furthermore, employing the configuration capable of providing an adequate low-pass filter effect for each region while distorting the image output to the image display element can cause the observer to observe a good image with reduced distortion, moire fringe and aliasing when the observer observes the image display element through the optical system.

Moreover, in this embodiment, at least one surface of the optical system is formed as a decentered surface with respect to the rays from the image display element 10. Therefore, miniaturization of the optical system can be achieved.

Furthermore, in this embodiment, since at least one surface of the optical system is formed as a rotationally asymmetric surface, a further miniaturization of the optical system and suppression of various aberrations generated in the optical system (in particular, chromatic aberration of magnification and axial chromatic aberration) can be achieved.

Moreover, in this embodiment, the image inversely corrected and displayed on the image display element 10 is a distorted image having a rotationally asymmetric shape. As a result, the contribution of the optical system to various aberration corrections is reduced and thereby the power setting of the optical system is not unreasonable, so that a large tolerance for the surfaces of the optical system can be obtained, which can facilitate manufacturing of the optical system.

In this embodiment, although the case where the number of pixels of the input image is the same as that of the image display element was described, these may be different from each other. In this case, the intensity of the low-pass filter effect may be set according to the setting condition for the low-pass filter effect, the setting condition corresponding to the original difference between the number of pixels of the input image and that of the image display element. This is the same in other embodiments described later.

TABLE 1

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 9.365 | 21.886 | −0.529 | −284.2114 | FFS1 | 1.5300 | 55.8 |
| 3 | 0.000 | −2.638 | 34.455 | −31.052 | −72.0536 | FFS2 | −1.5300 | 55.8 |
| 4 | 0.000 | 9.365 | 21.886 | −0.529 | −284.2114 | FFS1 | 1.5300 | 55.8 |
| 5 | 0.000 | 30.738 | 47.306 | 48.060 | −189.3367 | FFS3 | −1.5300 | 55.8 |
| 6 | 0.000 | 9.365 | 21.886 | −0.529 | −284.2114 | FFS1 | 1.5300 | 55.8 |
| 7 | 0.000 | −2.638 | 34.455 | −31.052 | −72.0536 | FFS2 | 1.5300 | 55.8 |
| 8 | 0.000 | −2.638 | 34.455 | −31.052 | −72.0536 | FFS2 | 1.5300 | 55.8 |
| 9 | 0.000 | −5.791 | 39.117 | −46.389 | −56.9404 | FFS4 | 1.0000 | |
| 10 | 0.000 | −7.538 | 37.525 | −53.721 | 18.2091 | SPH | 1.4875 | 70.2 |
| 11 | 0.000 | −16.105 | 43.813 | −53.721 | −21.5267 | SPH | 1.7618 | 26.5 |
| 12 | 0.000 | −17.556 | 44.878 | −53.721 | 66.0282 | SPH | 1.0000 | |
| 13 | 0.000 | −18.692 | 44.573 | −50.460 | 20.6510 | FFS5 | 1.5300 | 55.8 |
| 14 | 0.000 | −32.859 | 25.439 | −88.990 | −118.4382 | FFS6 | 1.0000 | |
| 15 | 0.000 | −49.433 | 29.812 | −45.448 | ∞ | SPH | 1.5230 | 58.6 |
| 16 | 0.000 | −50.288 | 30.654 | −45.448 | ∞ | SPH | 1.0000 | |
| 17 | 0.000 | −32.898 | 51.561 | −24.427 | 25.6080 | CYL | 1.7618 | 26.5 |
| 18 | 0.000 | −30.463 | 55.740 | −38.300 | 21.8260 | CYL | 1.0000 | |
| 19 | 0.000 | −38.215 | 64.167 | −66.742 | ∞ | SPH | 1.5500 | 52.0 |
| 20 | 0.000 | −38.858 | 64.443 | −66.742 | ∞ | SPH | 1.0000 | |
| 21 | 0.000 | −38.858 | 64.443 | −66.742 | 0.0000 | SPH | 1.0000 | 0.0 |

FFS1

$c_1$: 4.7708e+001  $c_5$: −2.2635e−003  $c_6$: −2.6964e−004  $c_{10}$: −3.5045e−006
$c_{11}$: −1.8961e−005  $c_{12}$: −2.5872e−007  $c_{13}$: −3.5080e−007  $c_{14}$: −1.8809e−007
$c_{20}$: −8.5708e−010  $c_{21}$: −5.5035e−010  $c_{22}$: −4.8677e−010  $c_{23}$: 1.7886e−011
$c_{24}$: 2.5426e−011  $c_{25}$: 1.2297e−011  $c_{26}$: 6.2276e−012

FFS2

$c_1$: −8.0283e−001  $c_5$: −1.3225e−003  $c_6$: −3.2740e−004  $c_{10}$: −1.0438e−005
$c_{11}$: −4.7937e−007  $c_{12}$: −5.0068e−008  $c_{13}$: −6.2302e−008  $c_{14}$: 4.5234e−008
$c_{20}$: 1.9842e−009  $c_{21}$: −5.0837e−010  $c_{22}$: 1.1409e−009  $c_{23}$: 1.8477e−011
$c_{24}$: −1.7819e−011  $c_{25}$: 1.2831e−011  $c_{26}$: −2.0655e−011

FFS3

$c_1$: 2.6924e+001  $c_5$: 2.4531e−004  $c_6$: −1.2389e−003  $c_{10}$: −4.7294e−005
$c_{11}$: 3.6501e−005  $c_{12}$: 2.1833e−006  $c_{13}$: −2.0621e−006  $c_{14}$: 1.3400e−006
$c_{20}$: −3.4331e−008  $c_{21}$: 2.1762e−008  $c_{22}$: −5.5534e−009  $c_{23}$: −2.7291e−010
$c_{24}$: −2.2240e−010  $c_{25}$: −2.8204e−010  $c_{26}$: 2.0643e−011

FFS4

$c_1$: −2.0112e+000  $c_5$: −1.1439e−003  $c_6$: −7.0182e−003  $c_{10}$: 6.6323e−005
$c_{11}$: 3.7827e−005  $c_{12}$: −3.0764e−007  $c_{13}$: −1.2255e−007  $c_{14}$: 2.8074e−007
$c_{20}$: −4.8304e−008  $c_{21}$: −6.8627e−009  $c_{22}$: 1.4540e−008  $c_{23}$: 1.9275e−010
$c_{24}$: −2.0887e−010  $c_{25}$: −6.5050e−010  $c_{26}$: 1.3565e−010

FFS5

$c_1$: 8.3170e−001  $c_5$: 2.2565e−003  $c_6$: −1.7932e−003  $c_{10}$: 4.9769e−005
$c_{11}$: 5.8833e−005  $c_{12}$: −1.8053e−006  $c_{13}$: 3.0888e−007  $c_{14}$: −2.4892e−006
$c_{20}$: −1.1149e−008  $c_{21}$: −5.0541e−008  $c_{22}$: 3.6852e−008  $c_{23}$: 1.3332e−009
$c_{24}$: −1.1902e−009  $c_{25}$: −7.4560e−011  $c_{26}$: 9.7807e−009

FFS6

$c_1$: 5.0873e−001  $c_5$: 1.7979e−003  $c_6$: 1.0845e−003  $c_{10}$: −4.0100e−005
$c_{11}$: −2.0713e−004  $c_{12}$: 3.9779e−006  $c_{13}$: 1.4457e−006  $c_{14}$: −2.9702e−007
$c_{20}$: −5.7229e−009  $c_{21}$: 2.9933e−008  $c_{22}$: −3.2629e−008  $c_{23}$: −5.6700e−011
$c_{24}$: −1.7802e−010  $c_{25}$: −2.0885e−010  $c_{26}$: −3.8998e−011

The optical data of the illumination light source 30 and polarizing plate 14 are not shown in Table 1. This is the same in other embodiments described later.

Embodiment 2

Figure 2A:
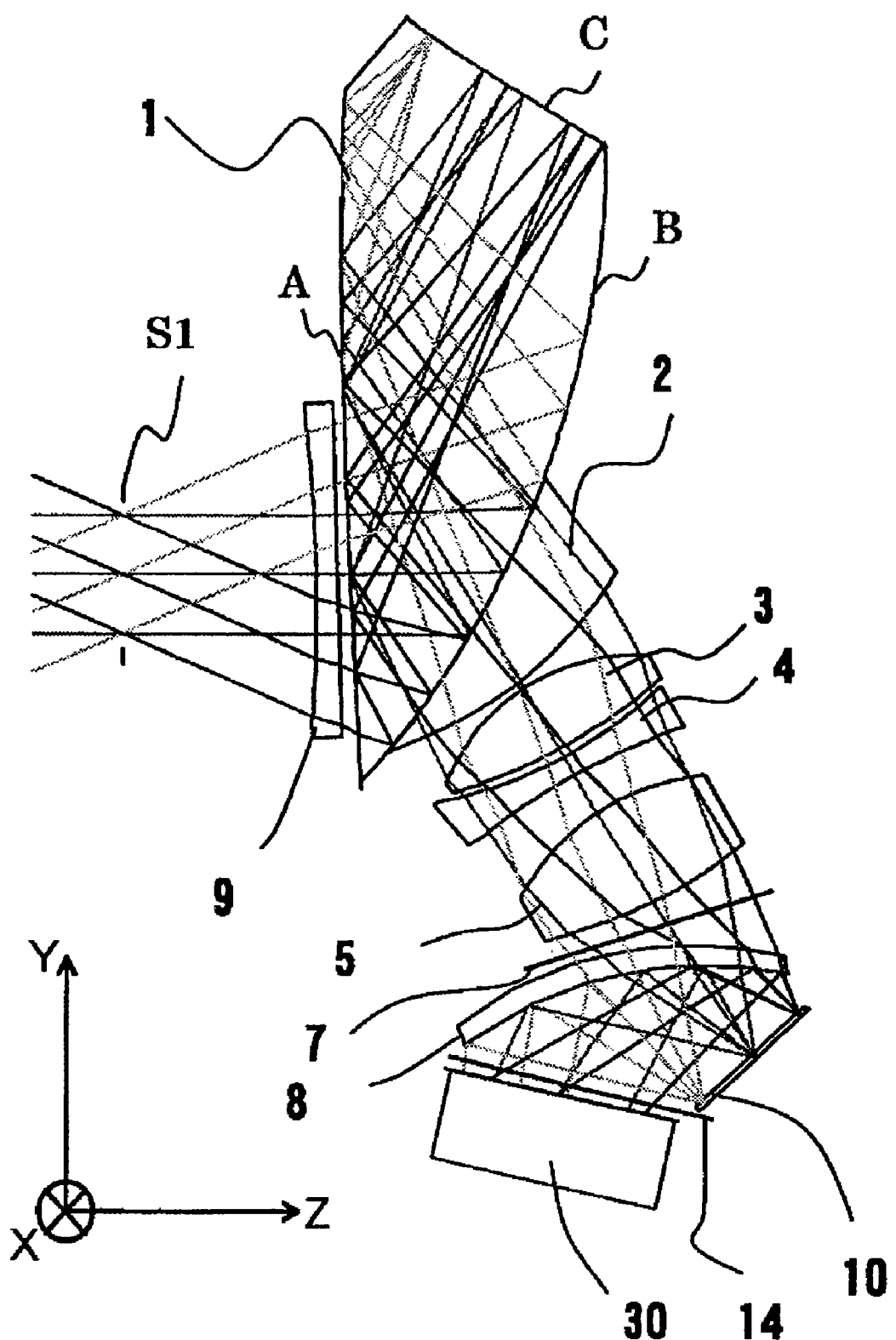
FIG. 2A is a cross-sectional view showing the configuration of an optical system that is Embodiment 2 of the present invention.

FIG. 2A shows the configuration of a display optical system for an HMD that is Embodiment 2 of the present invention. An optical element 1 is a prism member having three or more optical surfaces on a transparent media whose refractive index is larger than 1. An optical element 2 is a prism member having two optical surfaces on a transparent media whose refractive index is larger than 1. Reference numerals 3, 4, 5, and 9 denote lenses each having two surfaces. Reference numeral 8 denotes a decentered cylindrical lens. Reference numeral 10 denotes an image display element (reflective LCD).

A surface of the cylindrical lens 8 which is closer to the LCD 10 is a transmitting/reflecting surface (half mirror).

An illumination light source 30 is a planar illumination light source. When light emitted from the planar illumination light source 30 enters the LCD 10, the cylindrical lens 8 has the role as an illumination optical system.

In this embodiment, all surfaces constituting the optical elements 1 and 2 and the lens 5 have a plane-symmetric shape with respect to a plane parallel to the sheet of FIG. 2A (yz-cross section) as the only plane of symmetry.

The light emitted from the planar illumination light source 30 is transmitted through a polarizing plate 14 to be converted into linearly-polarized light and then is reflected by a surface S23 of the cylindrical lens 8 to proceed to the LCD 10. The light obliquely entering the LCD 10 and reflected by its image-displaying surface in an oblique direction passes through the cylindrical lens 8 and then is transmitted through a polarizing plate 7 to enter the lens 5. The functions of the polarizing plates 7 and 14 are the same as those in Embodiment 1.

The light emerging from the lens 5 is transmitted through the lenses 4 and 3 to enter the optical element 2. Furthermore, the light is transmitted through the cemented surface of the optical elements 2 and 1 to enter the optical element 1.

The light entering the optical element 1 from a surface B is introduced to a surface C after being reflected on a surface A. The light impinging on the surface C is subjected to the returning reflection in an approximately opposite direction and then proceeds inversely to the direction before the reflection on the surface C. The light reflected on the surface C is again reflected on the surface A, further again reflected on the surface B, emerges from the optical element 1 from the surface A and then proceeds to an exit pupil S1 through the lens 9.

A numerical example of this embodiment is shown in Table 2.

The unit of length in Table 2 is mm. Therefore, the optical system shown in Table 2 is a display optical system that displays an image whose size is about 18 mm×14 mm and horizontal field angle is 60° at the infinite position in the direction of the z-axis.

In this embodiment, an extremely large distortion is generated by the optical system. Therefore, an image subjected to the electric distorting processing (inverse-correction) in the direction inverse to that of the distortion generated by the optical system is output to the image display element. The output image (inversely-corrected image) obtained by inversely correcting the input image (FIG. 7) is shown in FIG. 2B.

Figure 2B:
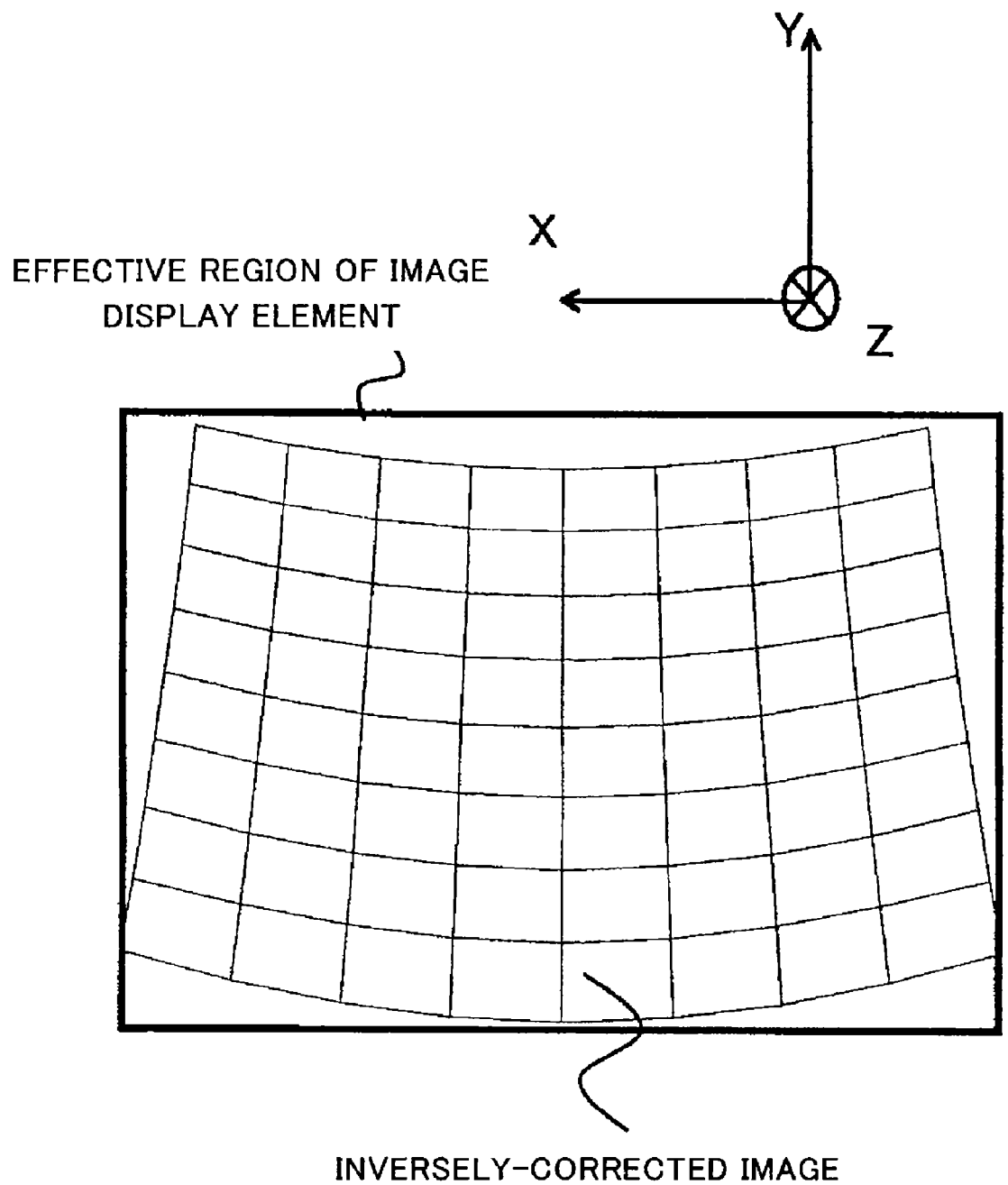
FIG. 2B is a figure showing an inversely-corrected image in Embodiment 2.

The calculation of the low-pass filter effect for each of 8×8 regions in the output image distorted as shown in FIG. 2B can obtain a region where the low-pass filter effect is high, a region where the low-pass filter effect is middle and a region where the low-pass filter effect is low, the calculation being performed according to the above-mentioned setting condition of the low-pass filter effect.

Thus, in this embodiment, the distortion is not corrected by the optical system, so that the optical system can be configured so as to contribute to corrections of various aberrations other than the distortion and to miniaturization of the optical system. This embodiment achieves a display optical system (that is, an image display apparatus) having an extremely good optical performance and thereby enabling to provide an image with reduced distortion while its size is small.

Furthermore, employing the configuration capable of providing an adequate low-pass filter effect for each region while distorting the image output to the image display element can cause the observer to observe a good image with reduced distortion, moire fringe and aliasing when the observer observes the image display element through the optical system.

TABLE 2

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 0.354 | 18.405 | 1.469 | −136.7211 | SPH | 1.7618 | 26.5 |
| 3 | 0.000 | 0.406 | 20.404 | 1.469 | ∞ | SPH | 1.0000 | |
| 4 | 0.000 | 9.259 | 21.177 | 2.214 | −469.1111 | FFS1 | 1.5300 | 55.8 |
| 5 | 0.000 | 5.022 | 38.481 | −23.133 | −75.5610 | FFS2 | −1.5300 | 55.8 |
| 6 | 0.000 | 9.259 | 21.177 | 2.214 | −469.1111 | FFS1 | 1.5300 | 55.8 |
| 7 | 0.000 | 34.209 | 54.410 | 55.179 | −180.1511 | FFS3 | −1.5300 | 55.8 |
| 8 | 0.000 | 9.259 | 21.177 | 2.214 | −469.1111 | FFS1 | 1.5300 | 55.8 |
| 9 | 0.000 | 5.022 | 38.481 | −23.133 | −75.5610 | FFS2 | 1.5300 | 55.8 |
| 10 | 0.000 | 5.022 | 38.481 | −23.133 | −75.5610 | FFS2 | 1.5300 | 55.8 |
| 11 | 0.000 | 0.345 | 46.831 | −31.122 | −107.1944 | FFS4 | 1.0000 | |
| 12 | 0.000 | −9.458 | 40.330 | −64.394 | 19.9021 | SPH | 1.4875 | 70.2 |
| 13 | 0.000 | −15.667 | 42.631 | −60.135 | −51.7320 | SPH | 1.0000 | |
| 14 | 0.000 | −16.654 | 42.682 | −60.413 | −40.0596 | SPH | 1.7618 | 26.5 |
| 15 | 0.000 | −17.814 | 44.691 | −63.011 | 65.9693 | SPH | 1.0000 | |
| 16 | 0.000 | −21.067 | 47.028 | −63.163 | 18.8246 | FFS5 | 1.5300 | 55.8 |
| 17 | 0.000 | −36.301 | 33.494 | −74.884 | −77.6795 | FFS6 | 1.0000 | |
| 18 | 0.000 | −34.770 | 53.842 | −89.719 | 36.9295 | CYL | 1.4875 | 70.4 |
| 19 | 0.000 | −36.670 | 53.819 | −87.760 | 38.5518 | CYL | 1.0000 | |
| 20 | 0.000 | −49.906 | 54.337 | −46.389 | ∞ | SPH | 1.5500 | 52.0 |
| 21 | 0.000 | −50.606 | 54.364 | −46.389 | ∞ | SPH | 1.0000 | |
| 22 | 0.000 | −50.606 | 54.364 | −46.389 | 0.0000 | SPH | 1.0000 | 0.0 |

FFS1

$c1: -3.5142e+000$    $c5: -1.1224e-003$    $c6: 3.0047e-004$    $c10: 1.6178e-006$
$c11: -2.3024e-006$    $c12: -1.0174e-007$    $c13: -1.3665e-007$    $c14: -8.2428e-008$
$c20: 6.4444e-011$    $c21: -4.5295e-010$    $c22: -3.8790e-010$    $c23: 3.3132e-013$
$c24: 2.2972e-013$    $c25: 6.0295e-013$    $c26: 1.4337e-012$

FFS2

$c1: 1.2950e+000$    $c5: -1.4032e-003$    $c6: -2.7965e-004$    $c10: 7.0382e-006$
$c11: 5.5439e-007$    $c12: -1.7720e-008$    $c13: 5.3552e-009$    $c14: 1.8816e-007$
$c20: -8.0878e-010$    $c21: 5.5724e-010$    $c22: -5.6967e-010$    $c23: -3.8603e-013$
$c24: -1.7807e-011$    $c25: -1.8045e-012$    $c26: -9.2497e-012$

TABLE 2-continued

| FFS3 | | | |
|---|---|---|---|
| c1: −5.9895e+000 | c5: −8.9010e−004 | c6: −6.3693e−005 | c10: 1.8175e−006 |
| c11: 9.7146e−006 | c12: 1.1339e−007 | c13: 4.2958e−009 | c14: 2.5671e−008 |
| c20: 9.3576e−011 | c21: −3.8979e−010 | c22: 3.1680e−009 | c23: −2.7038e−011 |
| c24: 7.7717e−012 | c25: −1.0598e−011 | c26: 5.4081e−012 | |
| FFS4 | | | |
| c1: 3.2848e+000 | c5: −1.3584e−003 | c6: −3.6912e−003 | c10: 6.8912e−005 |
| c11: 4.0703e−005 | c12: 6.8456e−007 | c13: −3.2043e−007 | c14: −3.3292e−007 |
| c20: −3.8440e−009 | c21: −2.6745e−009 | c22: 1.3757e−009 | c23: −1.6929e−010 |
| c24: −2.3522e−010 | c25: −1.0763e−010 | c26: −4.0575e−011 | |
| FFS5 | | | |
| c1: −5.3753e−001 | c5: 1.5035e−003 | c6: −1.7174e−004 | c10: 1.5884e−005 |
| c11: 1.3331e−004 | c12: −2.1151e−006 | c13: 9.6711e−007 | c14: −1.4211e−006 |
| c20: −6.6002e−008 | c21: 3.6230e−008 | c22: −1.6300e−008 | c23: 1.1167e−010 |
| c24: −1.1552e−009 | c25: 5.5383e−010 | c26: −2.7815e−009 | |
| FFS6 | | | |
| c1: 6.7826e−001 | c5: −3.6616e−003 | c6: 6.1230e−005 | c10: −9.0367e−006 |
| c11: −2.6342e−005 | c12: 5.1808e−007 | c13: 3.3044e−007 | c14: −1.0194e−007 |
| c20: −1.5907e−009 | c21: 7.6035e−009 | c22: 2.5169e−009 | c23: 2.9829e−010 |
| c24: −2.3108e−010 | c25: 5.8907e−012 | c26: 1.9299e−011 | |

Embodiment 3

Figure 3A:
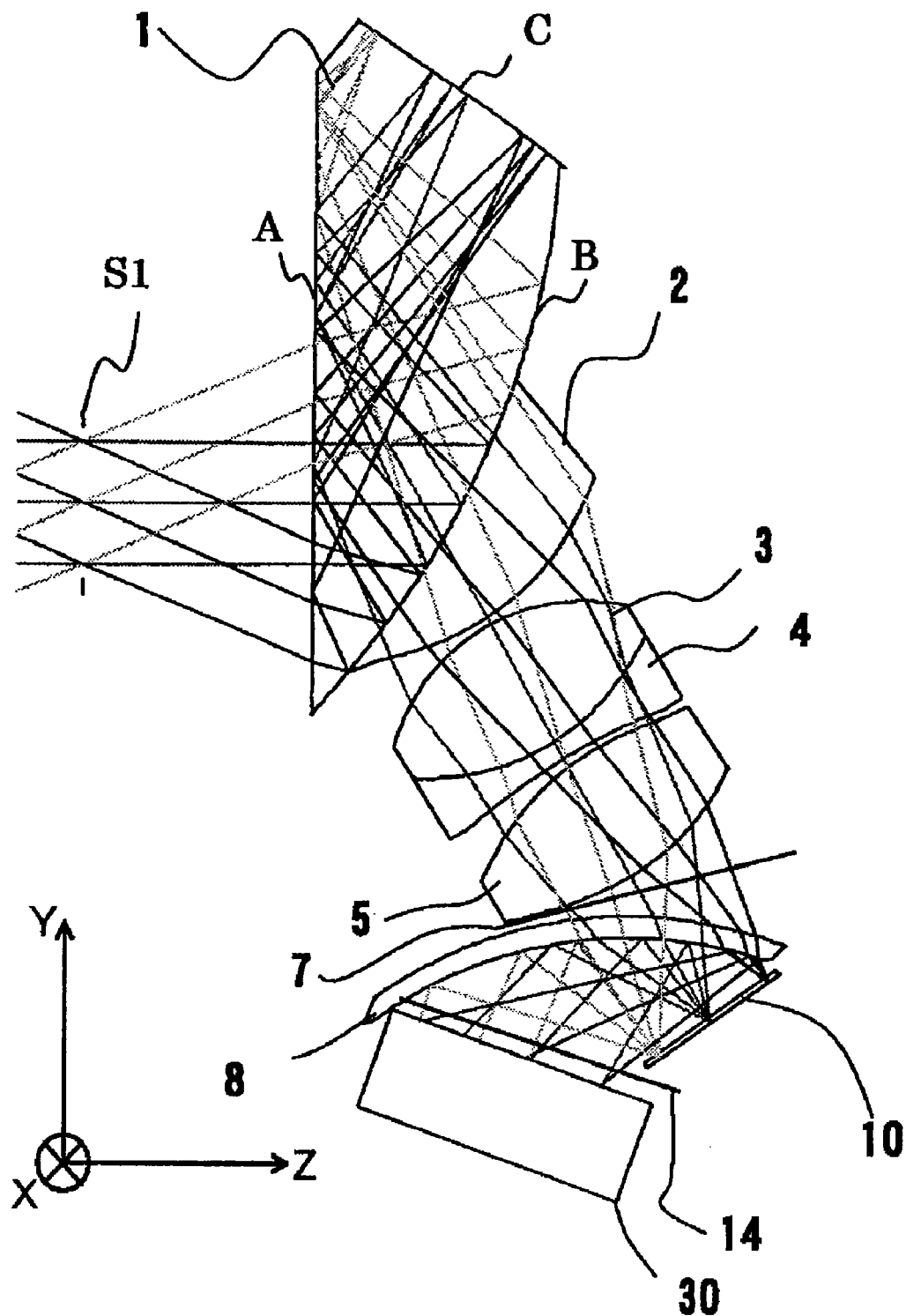
FIG. 3A is a cross-sectional view showing the configuration of an optical system that is Embodiment 3 of the present invention.

FIG. 3A shows the configuration of a display optical system for an HMD that is Embodiment 3 of the present invention.

An optical element 1 is a prism member having three or more optical surfaces on a transparent media whose refractive index is larger than 1, and an optical element 2 is a prism member having two optical surfaces on a transparent media whose refractive index is larger than 1. Reference numerals 3 and 4 denote cemented lenses, reference numeral 5 denotes a lens having two surfaces, and reference numeral 8 denotes a decentered cylindrical lens. Reference numeral 10 denotes an image display element (reflective LCD).

A surface of the cylindrical lens 8 which is closer to the LCD 10 is a transmitting/reflecting surface (half mirror).

An illumination light source 30 is a planar illumination light source. When light emitted from the planar illumination light source 30 enters the LCD 10, the cylindrical lens 8 has the role as an illumination optical system.

In this embodiment, all surfaces constituting the optical elements 1 and 2 and the lens 5 have a plane-symmetric shape with respect to a plane parallel to the sheet of FIG. 3A (yz-cross section) as the only plane of symmetry.

The light emitted from the planar illumination light source 30 is transmitted through a polarizing plate 14 to be converted into linearly-polarized light and then is reflected by a surface S23 of the cylindrical lens 8 to proceed to the LCD 10. The light obliquely entering the LCD 10 and reflected by its image-displaying surface in an oblique direction passes through the cylindrical lens 8 and then is transmitted through a polarizing plate 7 to enter the lens 5.

The light emerging from the lens 5 is transmitted through the cemented lenses 4 and 3 to enter the optical element 2. Furthermore, the light is transmitted through the cemented surface of the optical elements 2 and 1 to enter the optical element 1.

The light entering the optical element 1 from a surface B is introduced to a surface C after being reflected on a surface A. The light impinging on the surface C is subjected to the returning reflection in an approximately opposite direction and then proceeds inversely to the direction before the reflection on the surface C. The light reflected on the surface C is again reflected on the surface A, further again reflected on the surface B, emerges from the optical element 1 from the surface A and then proceeds to an exit pupil S1.

A numerical example of this embodiment is shown in Table 3.

The unit of length in Table 3 is mm. Therefore, the optical system shown in Table 3 is a display optical system that displays an image whose size is about 18 mm×14 mm and horizontal field angle is 60° at the infinite position in the direction of the z-axis.

In this embodiment, an extremely large distortion is generated by the optical system. Therefore, an image subjected to the electric distorting processing (inverse-correction) in the direction inverse to that of the distortion generated by the optical system is output to the image display element. The output image (inversely-corrected image) obtained by inversely correcting the input image (FIG. 7) is shown in FIG. 3B.

Figure 3B:
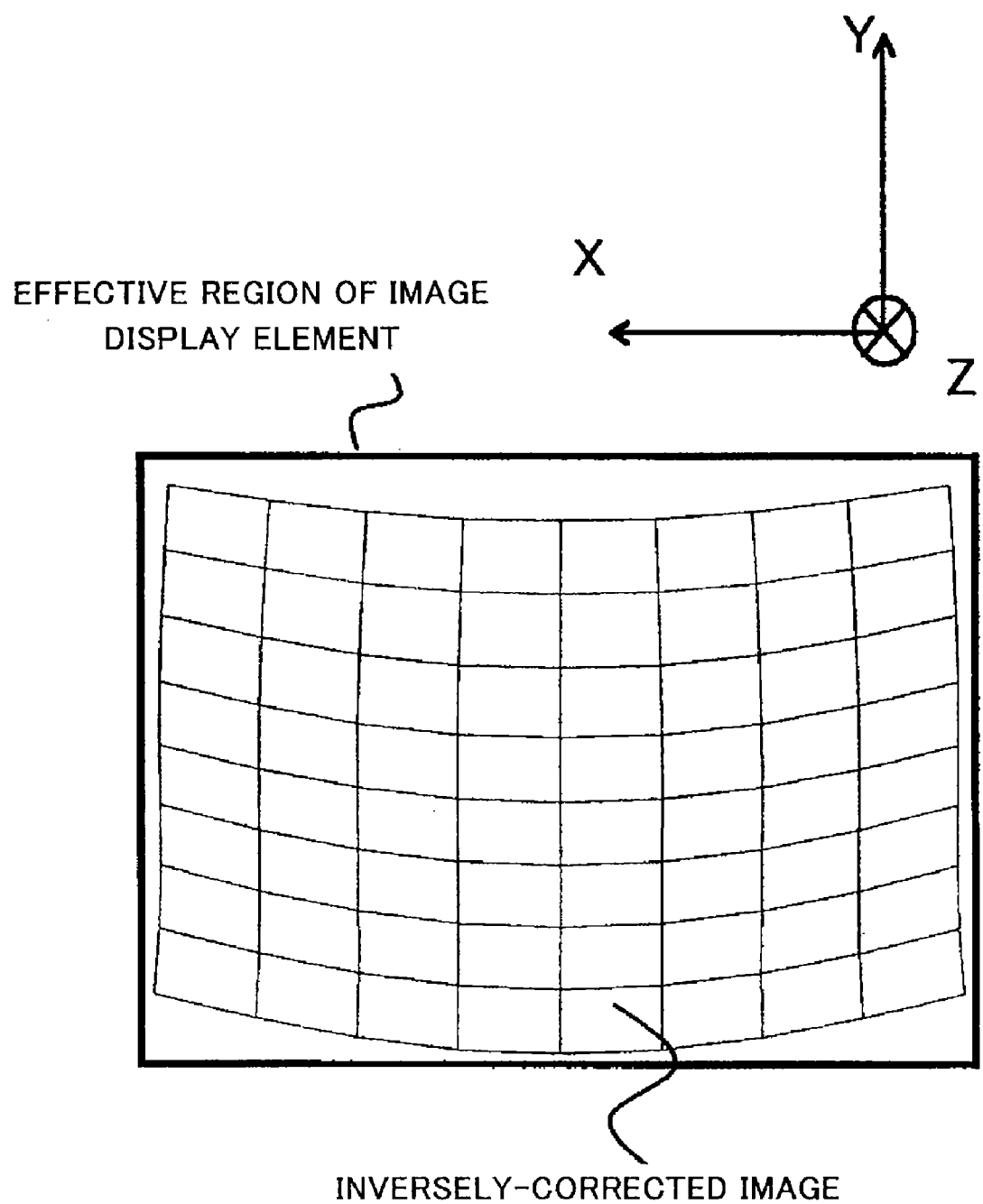
FIG. 3B is a figure showing an inversely-corrected image in Embodiment 3.

The calculation of the low-pass filter effect for each of 8×8 regions in the output image distorted as shown in FIG. 3B can obtain a region where the low-pass filter effect is high, a region where the low-pass filter effect is middle and a region where the low-pass filter effect is low, the calculation being performed according to the above-mentioned setting condition of the low-pass filter effect.

Thus, in this embodiment, the distortion is not corrected by the optical system, so that the optical system can be configured so as to contribute to corrections of various aberrations other than the distortion and to miniaturization of the optical system. This embodiment achieves a display optical system (that is, an image display apparatus) having an extremely good optical performance and thereby enabling to provide an image with reduced distortion while its size is small.

Furthermore, employing the configuration capable of providing an adequate low-pass filter effect for each region while distorting the image output to the image display element can cause the observer to observe a good image with reduced distortion, moire fringe and aliasing when the observer observes the image display element through the optical system.

TABLE 3

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 10.841 | 21.436 | −0.604 | −352.9905 | FFS1 | 1.5300 | 55.8 |
| 3 | 0.000 | −2.791 | 33.876 | −30.275 | −75.8089 | FFS2 | −1.5300 | 55.8 |
| 4 | 0.000 | 10.841 | 21.436 | −0.604 | −352.9905 | FFS1 | 1.5300 | 55.8 |
| 5 | 0.000 | 33.879 | 41.433 | 53.462 | −197.0908 | FFS3 | −1.5300 | 55.8 |
| 6 | 0.000 | 10.841 | 21.436 | −0.604 | −352.9905 | FFS1 | 1.5300 | 55.8 |
| 7 | 0.000 | −2.791 | 33.876 | −30.275 | −75.8089 | FFS2 | 1.5300 | 55.8 |
| 8 | 0.000 | −2.791 | 33.876 | −30.275 | −75.8089 | FFS2 | 1.5300 | 55.8 |
| 9 | 0.000 | −7.196 | 41.839 | −43.971 | −63.4555 | FFS4 | 1.0000 | |
| 10 | 0.000 | −11.638 | 37.392 | −58.707 | 18.6660 | SPH | 1.4875 | 70.2 |
| 11 | 0.000 | −22.246 | 43.841 | −58.707 | −22.2689 | SPH | 1.7618 | 26.5 |
| 12 | 0.000 | −23.785 | 44.776 | −58.707 | 61.7075 | SPH | 1.0000 | |
| 13 | 0.000 | −25.783 | 43.765 | −48.028 | 21.0144 | FFS5 | 1.5300 | 55.8 |
| 14 | 0.000 | −41.494 | 26.775 | −81.743 | −92.5180 | FFS6 | 1.0000 | |
| 15 | 0.000 | −38.685 | 45.914 | −82.594 | 41.2870 | CYL | 1.4875 | 70.2 |
| 16 | 0.000 | −40.878 | 44.746 | −80.774 | 41.2870 | CYL | 1.0000 | |
| 17 | 0.000 | −55.794 | 47.169 | −54.561 | ∞ | SPH | 1.5500 | 52.0 |
| 18 | 0.000 | −56.485 | 47.281 | −54.561 | ∞ | SPH | 1.0000 | |
| 19 | 0.000 | −56.485 | 47.281 | −54.561 | 0.0000 | SPH | 1.0000 | 0.0 |

FFS1

$c_1$: 7.2184e+001   $c_5$: −1.6665e−003   $c_6$: −7.2422e−005   $c_{10}$: −4.6772e−006
$c_{11}$: −1.2027e−005   $c_{12}$: −2.5677e−007   $c_{13}$: −4.8083e−007   $c_{14}$: −2.5025e−007
$c_{20}$: −2.3618e−010   $c_{21}$: 6.1664e−011   $c_{22}$: 3.8390e−010   $c_{23}$: 4.3369e−011
$c_{24}$: 6.6350e−011   $c_{25}$: 8.8166e−011   $c_{26}$: 4.8625e−011

FFS2

$c_1$: −2.6318e−001   $c_5$: −1.1855e−003   $c_6$: −3.6956e−004   $c_{10}$: −6.9695e−006
$c_{11}$: −1.0001e−006   $c_{12}$: −1.6620e−009   $c_{13}$: −1.1802e−007   $c_{14}$: 2.9418e−008
$c_{20}$: 8.8307e−010   $c_{21}$: 5.1973e−010   $c_{22}$: −4.6161e−010   $c_{23}$: 2.1291e−013
$c_{24}$: −1.7111e−012   $c_{25}$: 6.2447e−012   $c_{26}$: −4.4093e−012

FFS3

$c_1$: −6.6986e+001   $c_5$: 1.0045e−004   $c_6$: −1.1422e−003   $c_{10}$: 7.4597e−006
$c_{11}$: −2.2377e−005   $c_{12}$: 1.7250e−006   $c_{13}$: −1.5586e−006   $c_{14}$: 9.6682e−007
$c_{20}$: −4.4616e−008   $c_{21}$: 3.7490e−008   $c_{22}$: −2.3601e−008   $c_{23}$: −3.7207e−010
$c_{24}$: 9.9407e−011   $c_{25}$: −3.6052e−010   $c_{26}$: 7.2921e−011

FFS4

$c_1$: −6.5653e+000   $c_5$: −2.1549e−004   $c_6$: −6.3543e−003   $c_{10}$: 6.1509e−005
$c_{11}$: 5.1806e−005   $c_{12}$: −2.6789e−007   $c_{13}$: 1.5006e−008   $c_{14}$: −6.0216e−007
$c_{20}$: −1.9440e−008   $c_{21}$: −7.7214e−009   $c_{22}$: 2.8584e−009   $c_{23}$: 1.5916e−010
$c_{24}$: 4.7203e−010   $c_{25}$: −4.3913e−010   $c_{26}$: −1.4201e−010

FFS5

$c_1$: −2.2697e−001   $c_5$: 5.5284e−004   $c_6$: −8.9698e−005   $c_{10}$: −3.5449e−005
$c_{11}$: 7.2729e−005   $c_{12}$: −2.1230e−006   $c_{13}$: 1.4771e−006   $c_{14}$: −2.5204e−006
$c_{20}$: 2.2693e−008   $c_{21}$: −5.3195e−008   $c_{22}$: −2.1732e−009   $c_{23}$: 4.1625e−010
$c_{24}$: −5.0053e−010   $c_{25}$: 1.1931e−009   $c_{26}$: −2.8094e−009

FFS6

$c_1$: −2.5783e+001   $c_5$: 1.9452e−003   $c_6$: 1.2450e−003   $c_{10}$: −2.5389e−005
$c_{11}$: −1.6737e−004   $c_{12}$: 4.7165e−006   $c_{13}$: 1.5333e−006   $c_{14}$: −9.3819e−008
$c_{20}$: −3.2552e−009   $c_{21}$: 3.1982e−008   $c_{22}$: 1.3708e−008   $c_{23}$: 3.2537e−010
$c_{24}$: −2.7285e−010   $c_{25}$: −1.2959e−010   $c_{26}$: 3.0139e−011

Embodiment 4

Figure 4A:
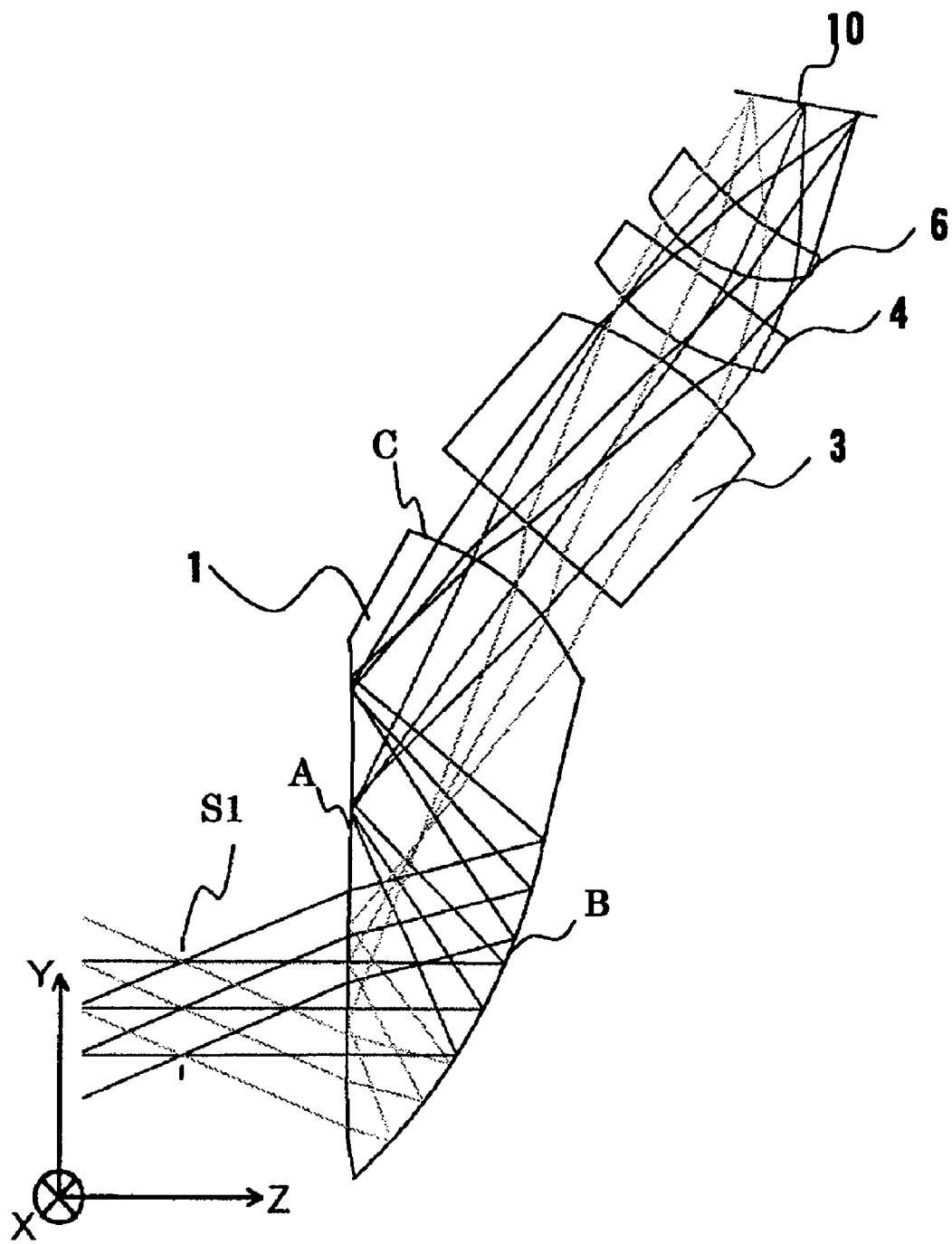
FIG. 4A is a cross-sectional view showing the configuration of an optical system that is Embodiment 4 of the present invention.

FIG. 4A shows the configuration of a display optical system for an HMD that is Embodiment 4 of the present invention.

An optical element 1 is a prism member having three or more optical surfaces on a transparent media whose refractive index is larger than 1. Reference numerals 3, 4, and 6 denote lenses each having two surfaces. Reference numeral 10 denotes an image display element (reflective LCD). In this embodiment, an illumination light source is not shown.

In this embodiment, all surfaces constituting the optical elements 1 have a plane-symmetric shape with respect to a plane parallel to the sheet of FIG. 4A (yz-cross section) as the only plane of symmetry.

The light emerging from the image display element 10 is transmitted through the lenses 6, 4, and 3 to enter the optical element 1 from a surface C. The light entering the optical element 1 is reflected on a surface B after being reflected on a surface A, and then emerges from the optical element 1 from the surface A to proceed to an exit pupil S1.

A numerical example of this embodiment is shown in Table 4.

The unit of length in Table 4 is mm. Therefore, the optical system shown in Table 4 is a display optical system that displays an image whose size is about 18 mm×14 mm and horizontal field angle is 60° at the infinite position in the direction of the z-axis.

In this embodiment, an extremely large distortion is generated by the optical system. Therefore, an image subjected to the electric distorting processing (inverse-correction) in the direction inverse to that of the distortion generated by the optical system is output to the image display element. The output image (inversely-corrected image) obtained by inversely correcting the input image (FIG. 7) is shown in FIG. 4B.

Figure 4B:
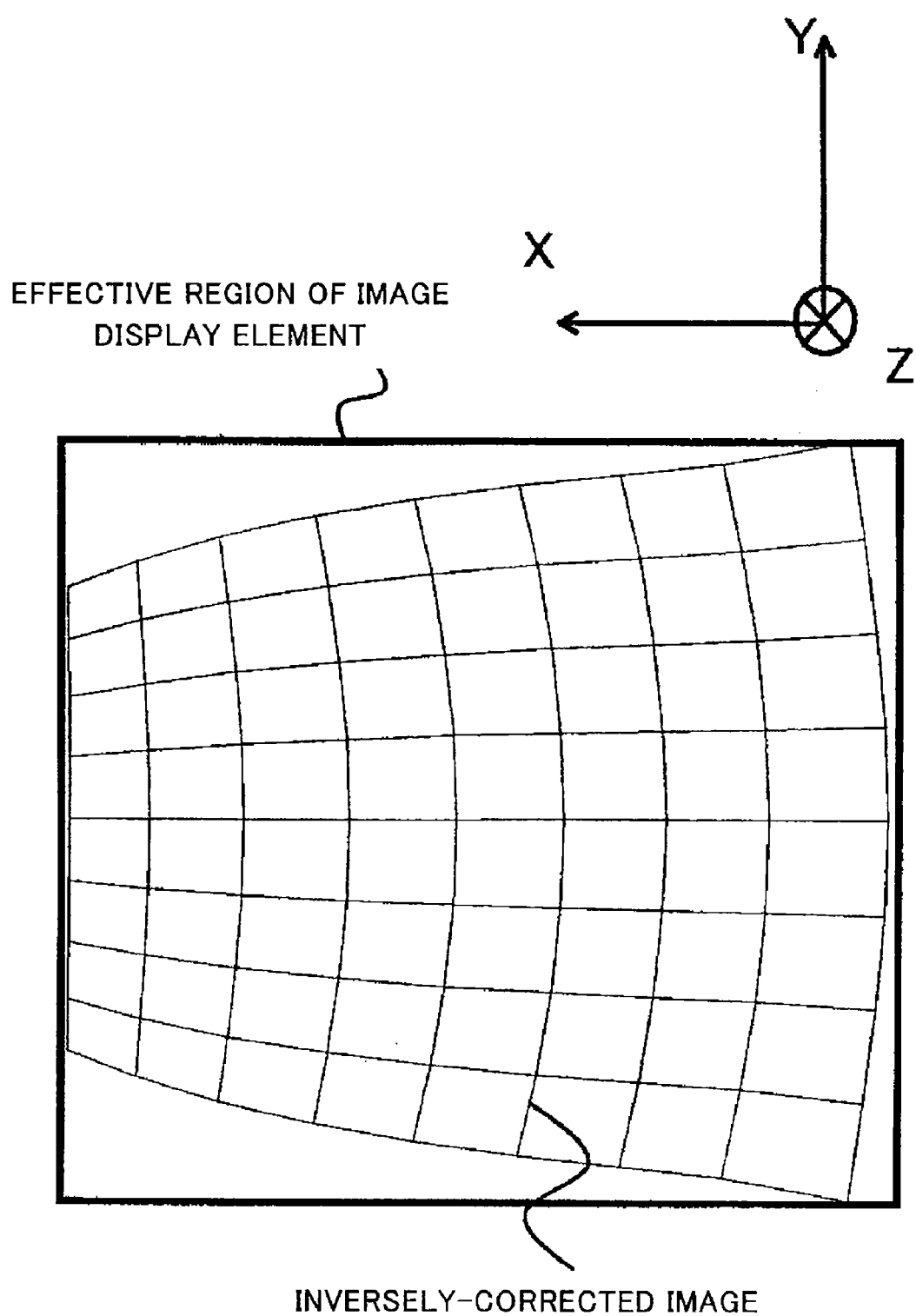
FIG. 4B is a figure showing an inversely-corrected image in Embodiment 4.

The calculation of the low-pass filter effect for each of 8×8 regions in the output image distorted as shown in FIG. 4B can obtain a region where the low-pass filter effect is high, a region where the low-pass filter effect is middle and a region where the low-pass filter effect is low, the calculation being performed according to the above-mentioned setting condition of the low-pass filter effect.

Thus, in this embodiment, the distortion is not corrected in the optical system, so that the optical system can be configured so as to contribute to corrections of various aberrations other than the distortion and to miniaturization of the optical system. This embodiment achieves a display optical system (that is, an image display apparatus) having an extremely good optical performance and thereby enabling to provide an image with reduced distortion while its size is small.

Furthermore, employing the configuration capable of providing an adequate low-pass filter effect for each region while distorting the image output to the image display element can cause the observer to observe a good image with reduced distortion, moire fringe and aliasing when the observer observes the image display element through the optical system.

parent media whose refractive index is larger than 1. Reference numerals 4 and 5 denote lenses each having two surfaces; these lenses 4 and 5 are cemented with each other. Reference numeral 10 denotes an image display element (reflective LCD). In this embodiment, an illumination light source is not shown.

Figure 5A:
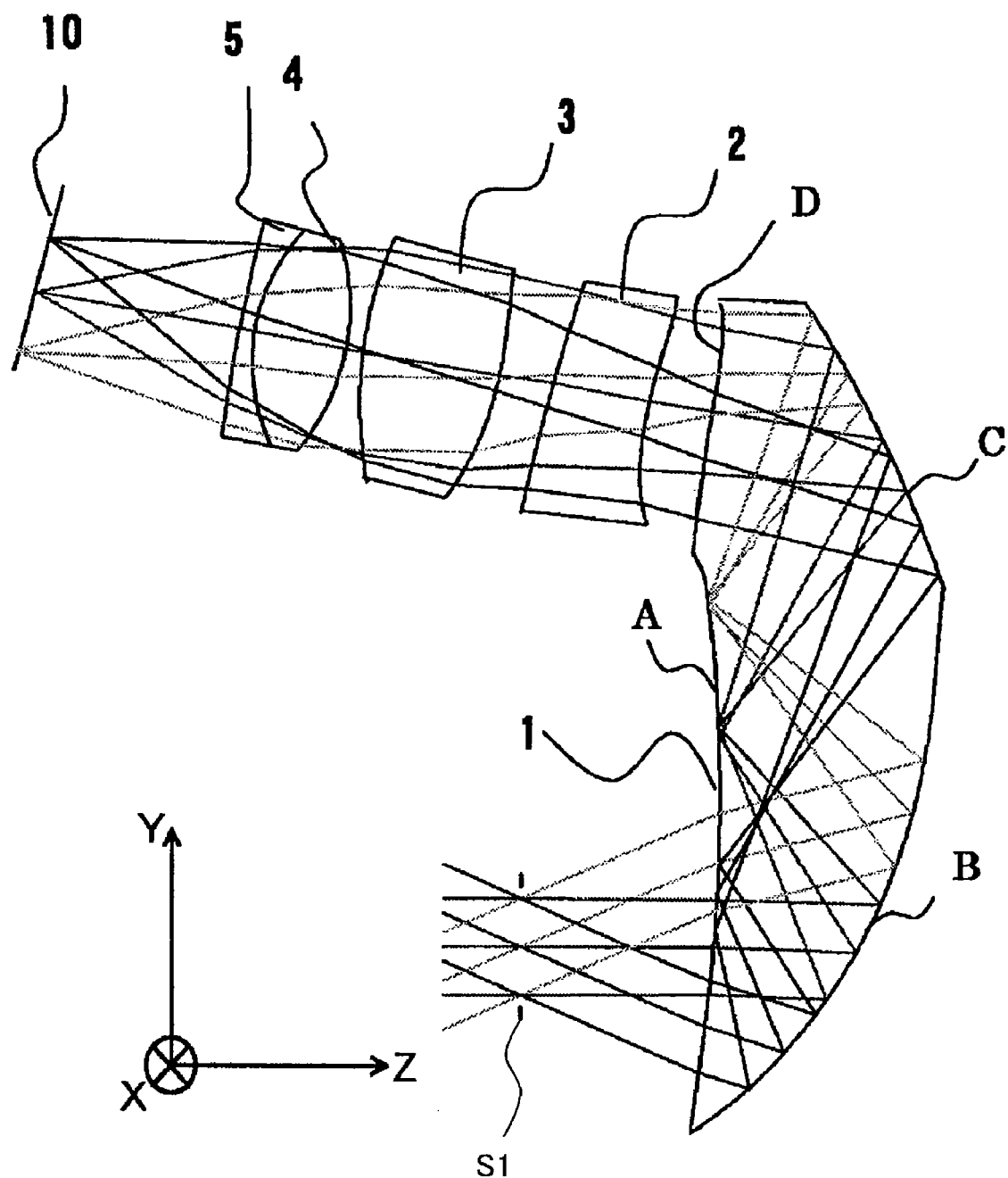
FIG. 5A is a cross-sectional view showing the configuration of an optical system that is Embodiment 5 of the present invention.

In this embodiment, all surfaces constituting the optical elements 1, 2 and 3 have a plane-symmetric shape with respect to a plane parallel to the sheet of FIG. 5A (yz-cross section) as the only plane of symmetry.

The light emerging from the image display element 10 is transmitted through the lenses 5 and 4 and the optical elements 3 and 2 to enter the optical element 1 from a surface D. The light entering the optical element 1 is reflected on a surface A after being reflected on a surface C, further reflected on a surface B, and then emerges from the optical element 1 from the surface A to proceed to an exit pupil S1.

A numerical example of this embodiment is shown in Table 5.

The unit of length in Table 5 is mm. Therefore, the optical system shown in Table 5 is a display optical system that displays an image whose size is about 18 mm×14 mm and horizontal field angle is 60° at the infinite position in the direction of the z-axis.

In this embodiment, an extremely large distortion is generated by the optical system. Therefore, an image subjected to

TABLE 4

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 14.451 | 20.154 | −1.074 | −718.3837 | FFS1 | 1.5300 | 55.8 |
| 3 | 0.000 | −2.366 | 35.080 | −30.181 | −72.6014 | FFS2 | −1.5300 | 55.8 |
| 4 | 0.000 | 14.451 | 20.154 | −1.074 | −718.3837 | FFS1 | 1.5300 | 55.8 |
| 5 | 0.000 | 38.725 | 48.761 | 28.404 | −69.8715 | FFS3 | 1.0000 | |
| 6 | 0.000 | 57.966 | 42.294 | 49.155 | 4400.3327 | SPH | 1.6775 | 31.6 |
| 7 | 0.000 | 77.413 | 59.108 | 53.609 | −41.8639 | SPH | 1.0000 | |
| 8 | 0.000 | 82.841 | 56.549 | 51.868 | 30.0884 | SPH | 1.5769 | 62.8 |
| 9 | 0.000 | 89.294 | 61.614 | 54.919 | −332.5298 | SPH | 1.0000 | |
| 10 | 0.000 | 90.995 | 62.089 | 54.463 | 17.0171 | SPH | 1.5633 | 63.7 |
| 11 | 0.000 | 95.850 | 68.175 | 52.535 | 39.9059 | SPH | 1.0000 | |
| 12 | 0.000 | 108.390 | 77.785 | 79.641 | 0.0000 | SPH | 1.0000 | 0.0 |

FFS1

$c_1$: −6.6774e+002  $c_5$: −6.6762e−004  $c_6$: 1.2170e−004  $c_{10}$: −1.3837e−005
$c_{11}$: −2.2316e−005  $c_{12}$: 1.0432e−007  $c_{13}$: 2.9061e−008  $c_{14}$: −8.8845e−008

FFS2

$c_1$: −1.9853e+000  $c_5$: −1.3309e−003  $c_6$: −6.6634e−004  $c_{10}$: −4.4072e−006
$c_{11}$: −2.7890e−006  $c_{12}$: −5.2049e−008  $c_{13}$: −1.0060e−010  $c_{14}$: 4.6680e−008
$c_{20}$: 1.6059e−010  $c_{21}$: −1.0975e−010  $c_{22}$: 5.7038e−010  $c_{23}$: −4.6867e−012
$c_{24}$: 3.5001e−012  $c_{25}$: 2.3136e−013  $c_{26}$: −3.8790e−012

FFS3

$c_1$: −6.5731e−001  $c_5$: −6.0265e−003  $c_6$: 8.1242e−004  $c_{10}$: −1.5245e−004
$c_{11}$: −6.2679e−005  $c_{12}$: 1.8282e−006  $c_{13}$: 2.3303e−006  $c_{14}$: −7.2543e−007
$c_{20}$: 3.6365e−009  $c_{21}$: 3.7097e−008  $c_{22}$: 1.2747e−008  $c_{23}$: 2.3783e−010
$c_{24}$: −2.5087e−010  $c_{25}$: −4.6163e−010  $c_{26}$: 4.8817e−010

Embodiment 5

FIG. 5A shows the configuration of a display optical system for an HMD that is Embodiment 5 of the present invention.

An optical element 1 is a prism member having three or more optical surfaces, which are a surface A, a surface B, a surface C and a surface D, on a transparent media whose refractive index is larger than 1. Optical elements 2 and 3 are prism members each having two optical surfaces on a transthe electric distorting processing (inverse-correction) in the direction inverse to that of the distortion generated by the optical system is output to the image display element. The output image (inversely-corrected image) obtained by inversely correcting the input image (FIG. 7) is shown in FIG. 5B.

Figure 5B:
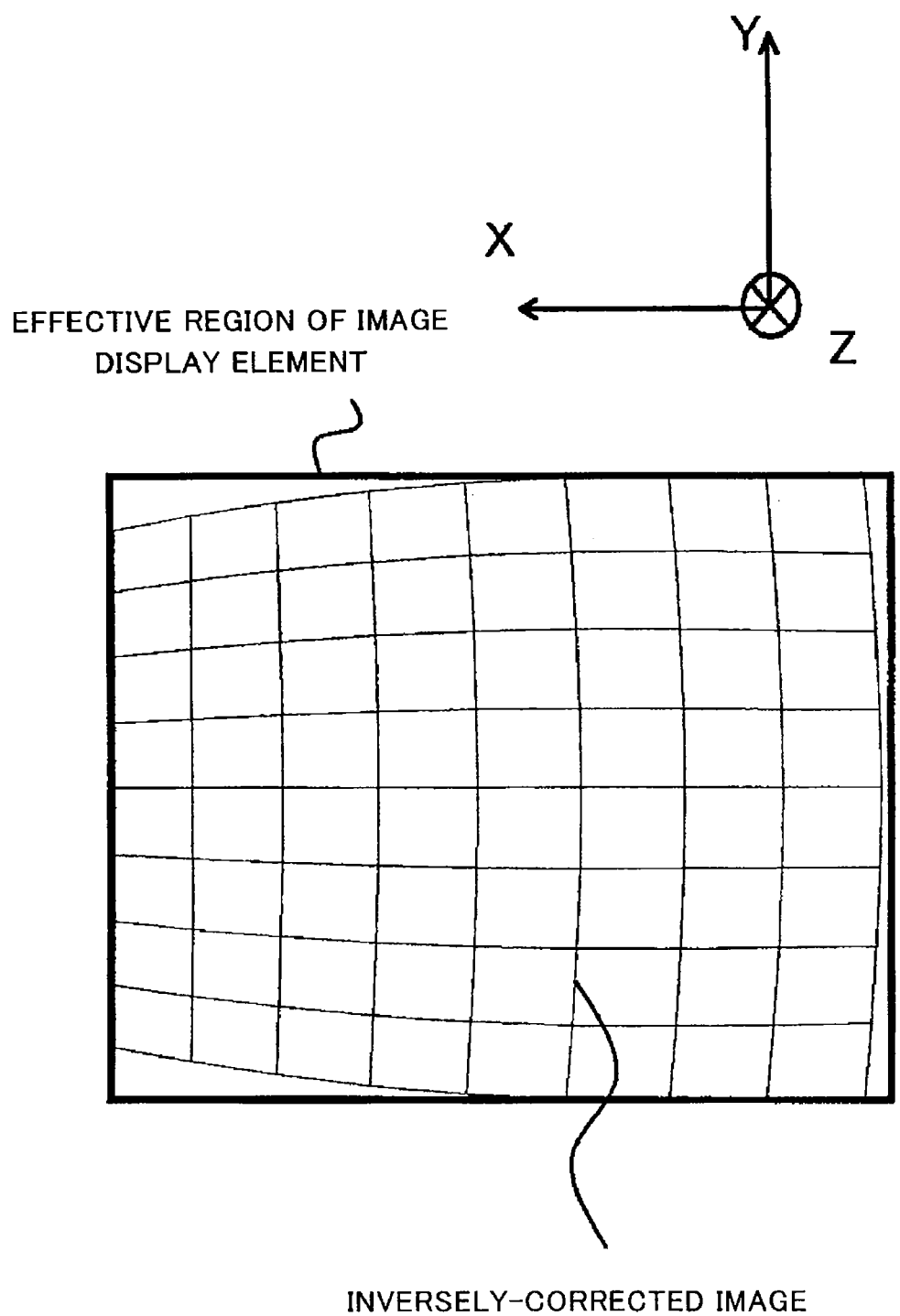
FIG. 5B is a figure showing an inversely-corrected image in Embodiment 5.

The calculation of the low-pass filter effect for each of 8×8 regions in the output image distorted as shown in FIG. 5B can obtain a region where the low-pass filter effect is high, a region where the low-pass filter effect is middle and a region where the low-pass filter effect is low, the calculation being performed according to the above-mentioned setting condition of the low-pass filter effect.

Thus, in this embodiment, the distortion is not corrected in the optical system, so that the optical system can be configured so as to contribute to corrections of various aberrations other than the distortion and to miniaturization of the optical system. This embodiment achieves a display optical system (that is, an image display apparatus) having an extremely good optical performance and thereby enabling to provide an image with reduced distortion while its size is small.

Furthermore, employing the configuration capable of providing an adequate low-pass filter effect for each region while distorting the image output to the image display element can cause the observer to observe a good image with reduced distortion, moire fringe and aliasing when the observer observes the image display element through the optical system.

TABLE 5

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 6.001 | 22.661 | −3.015 | −244.6358 | FFS1 | 1.5300 | 55.8 |
| 3 | 0.000 | −5.783 | 35.586 | −34.841 | −63.4009 | FFS2 | −1.5300 | 55.8 |
| 4 | 0.000 | 6.001 | 22.661 | −3.015 | −244.6358 | FFS1 | 1.5300 | 55.8 |
| 5 | 0.000 | 33.742 | 51.816 | 16.395 | −134.9399 | FFS3 | −1.5300 | 55.8 |
| 6 | 0.000 | 52.536 | 20.599 | −6.691 | 59.4225 | FFS4 | −1.0000 | |
| 7 | 0.000 | 61.922 | 14.511 | −11.271 | 62.2478 | FFS5 | −1.5709 | 33.8 |
| 8 | 0.000 | 60.404 | 2.242 | −14.204 | 143.5896 | FFS6 | −1.0000 | |
| 9 | 0.000 | 64.966 | −2.985 | −14.247 | −37.9321 | FFS7 | −1.5300 | 55.8 |
| 10 | 0.000 | 72.989 | −18.039 | −11.670 | 54.1602 | FFS8 | −1.0000 | |
| 11 | 0.000 | 69.302 | −20.684 | −11.670 | −25.7628 | SPH | −1.6125 | 60.7 |
| 12 | 0.000 | 72.478 | −31.079 | −11.670 | 22.2050 | SPH | −1.7552 | 27.6 |
| 13 | 0.000 | 72.838 | −32.824 | −11.670 | 183.0353 | SPH | −1.0000 | |
| 14 | 0.000 | 77.668 | −56.210 | −15.137 | 0.0000 | SPH | −1.0000 | 0.0 |

FFS1 c1: 2.5709e+001   c5: −2.2951e−003   c6: −1.2671e−003   c10: −9.0272e−006
c11: −2.6018e−005   c12: 2.6016e−007   c13: −1.8366e−007   c14: −1.1967e−007
c20: −1.5225e−009   c21: 1.5850e−010   c22: 3.4085e−009   c23: 2.9938e−012
c24: −2.2093e−011   c25: −1.6024e−011   c26: 8.0489e−012

FFS2 c1: −2.7121e−001   c5: −1.1914e−003   c6: −5.1007e−004   c10: 3.3657e−006
c11: −2.4642e−006   c12: −3.2679e−008   c13: −2.4434e−008   c14: −3.3506e−008
c20: 6.6519e−010   c21: −4.4056e−010   c22: 4.4458e−010   c23: 4.3419e−012
c24: −3.1794e−012   c25: −5.4346e−013   c26: −3.8402e−012

FFS3 c1: 6.0381e−001   c5: −1.0115e−004   c6: 2.0574e−004   c10: 2.3999e−007
c11: −7.8454e−006   c12: 2.5931e−008   c13: 2.0375e−009   c14: 1.9470e−009
c20: −2.2269e−012   c21: 1.5218e−010   c22: −9.4066e−010   c23: −2.6234e−011
c24: −3.0703e−012   c25: 3.0102e−012   c26: −8.9320e−013

FFS4 c1: −2.7539e+000   c5: 7.1799e−004   c6: −2.6347e−003   c10: 5.5003e−006
c11: −1.7782e−006   c12: −1.3269e−007   c13: −5.0486e−007   c14: −2.0578e−007
c20: −4.5659e−009   c21: −1.2435e−008   c22: −1.5262e−008   c23: 6.1551e−010
c24: −1.2093e−010   c25: 4.7333e−010   c26: −2.1595e−010

FFS5 c1: 7.2268e−001   c5: 9.7360e−004   c6: 1.4458e−003   c10: −8.9127e−005
c11: 4.1840e−005   c12: −2.3570e−006   c13: −1.1168e−006   c14: 6.5803e−007
c20: −6.8198e−005   c21: −5.3553e−009   c22: −1.1075e−007   c23: 8.3682e−010
c24: 4.3730e−010   c25: 4.8670e−010   c26: 3.9744e−010

FFS6 c1: −1.1040e+001   c5: −3.7530e−004   c6: −5.7247e−004   c10: 3.5336e−006
c11: −3.4104e−005   c12: −1.0482e−007   c13: 5.3276e−007   c14: −2.8062e−007
c20: 8.5614e−009   c21: 2.1113e−011   c22: −3.9658e−008   c23: −2.9025e−010
c24: 3.9761e−010   c25: −1.7519e−011   c26: −4.7418e−011

FFS7 c1: 1.7736e−001   c5: −2.0250e−003   c6: 1.0966e−004   c10: 4.7470e−005
c11: −3.9099e−005   c12: 9.8450e−008   c13: 2.2094e−007   c14: 2.9521e−007
c20: 2.6216e−008   c21: −2.3300e−009   c22: 1.8448e−008   c23: −6.4972e−010
c24: 2.4594e−010   c25: −5.1593e−010   c26: 1.8772e−010

FFS8 c1: −2.7775e+000   c5: −4.0966e−004   c6: 3.3381e−004   c10: −1.0575e−005
c11: −1.2205e−005   c12: 2.9793e−007   c13: −1.4652e−006   c14: 5.6747e−007
c20: 6.8063e−008   c21: −1.0022e−008   c22: 2.0087e−008   c23: −2.5509e−010
c24: 1.3135e−010   c25: −1.5838e−010   c26: 5.5155e−010

According to each of the above-described embodiments, when performing the electric distorting processing (inverse-correction) for the input image, an adequate low-pass filter effect can be set depending on the relationship of the number of pixels in a specific region before and after the distorting processing. Therefore, generation of the moire fringe can be reduced while suppressing deterioration of resolution.

Furthermore, the present invention is not limited to these embodiments and various variations and modifications may be made without departing from the scope of the present invention.

This application claims foreign priority benefits based on Japanese Patent Application No. 2006-236439, filed on Aug. 31, 2006, which is hereby incorporated by reference herein in its entirety as if fully set forth herein.

What is claimed is:

1. An image display apparatus comprising:
an image display element;
an optical system for observation of an image displayed on the image display element;
a processor which performs distorting processing that electrically provides to an input image a distortion in a direction inverse to that of distortion as aberration generated by the optical system, and displays an image subjected to the distorting processing on the image display element; and
a filter which provides a low-pass filter effect to the image that is observed through the optical system,
wherein, when a first image region that includes a first number of pixels in the input image is converted into a second image region that includes a second number of pixels by the distorting processing, the filter provides the low-pass filter effect depending on the relationship between the first number of pixels and the second number of pixels to the second image region that is observed through the optical system.

2. An image display apparatus according to claim 1, wherein, when the second number of pixels is less than the first number of pixels, the filter provides to the second image region that is observed through the optical system the low-pass filter effect higher than that when the second number of pixels is more than the first number of pixels.

3. An image display apparatus according to claim 1, wherein, when the second number of pixels is less than the first number of pixels, the low-pass filter effect provided by the filter to the second image region that is observed through the optical system becomes higher as the difference between the first number of pixels and the second number of pixels increases.

4. An image display apparatus according to claim 1, wherein the filter provides to each of a plurality of the second image regions the low-pass filter effect that changes depending on the relationship between the first number of pixels and the second number of pixels.

5. An image display apparatus according to claim 1, wherein the filter optically provides the low-pass filter effect to an image formed with a light flux from the image display element.

6. An image display apparatus according to claim 1, wherein the filter provides the low-pass filter effect by electric processing to an image displayed in the image display element.

7. An image display apparatus according to claim 1, wherein the image displayed on the image display element after the distorting processing is a distorted image having a rotationally asymmetric shape.

8. An image display system comprising:
an image display apparatus according to claim 1; and
an image supplying apparatus which supplies image information to the image display apparatus.

* * * * *